(12) United States Patent
Suzuki

(10) Patent No.: US 6,490,264 B1
(45) Date of Patent: Dec. 3, 2002

(54) DATA TRANSMISSION METHOD AND SYSTEM

(75) Inventor: Kyosuke Suzuki, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/272,651

(22) Filed: Mar. 18, 1999

(30) Foreign Application Priority Data

Jul. 3, 1998 (JP) ............................................ 10-189014

(51) Int. Cl.⁷ ........................... H04L 12/28; H04J 3/24; H04Q 7/24
(52) U.S. Cl. ................... 370/338; 370/395.1; 370/471; 370/474
(58) Field of Search ............................... 370/338, 349, 370/389, 390, 392, 395.1, 397, 399, 401, 471, 473, 474, 412, 428, 429, 394, 230, 465

(56) References Cited

U.S. PATENT DOCUMENTS

| | | | | |
|---|---|---|---|---|
| 5,570,362 A | * | 10/1996 | Nishimura | ............... 370/395.1 |
| 5,930,265 A | * | 7/1999 | Duault et al. | ................ 370/473 |
| 5,987,034 A | * | 11/1999 | Simon et al. | ................ 370/465 |
| 6,134,246 A | * | 10/2000 | Cai et al. | .................... 370/394 |
| 6,256,323 B1 | * | 7/2001 | Benayoun et al. | ........... 370/474 |
| 6,292,487 B1 | * | 9/2001 | Kunito et al. | ................ 370/230 |

* cited by examiner

Primary Examiner—Alpus H. Hsu
Assistant Examiner—Afsar M Qureshi
(74) Attorney, Agent, or Firm—Katten Muchin Zavis Rosenman

(57) ABSTRACT

Three base station devices are connected to a base station control device in series. The payload of a cell storing data to be transmitted is partitioned into three areas, which are respectively allocated to the base station devices. The base station control device stores the data to be transmitted to corresponding base station devices in these three areas. Allocation pattern information indicating the allocation pattern of the payload is stored in the header of the cell. Upon receipt of the cell, the base station devices respectively extract the data addressed to the devices themselves based on the allocation pattern information stored in the header of the cell.

18 Claims, 28 Drawing Sheets

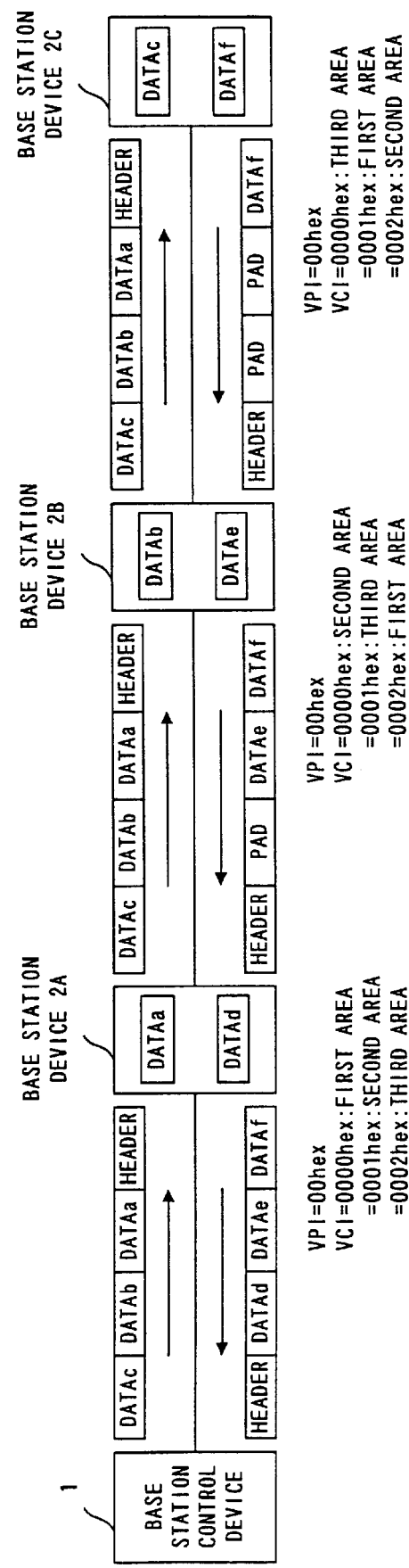
F I G. 6

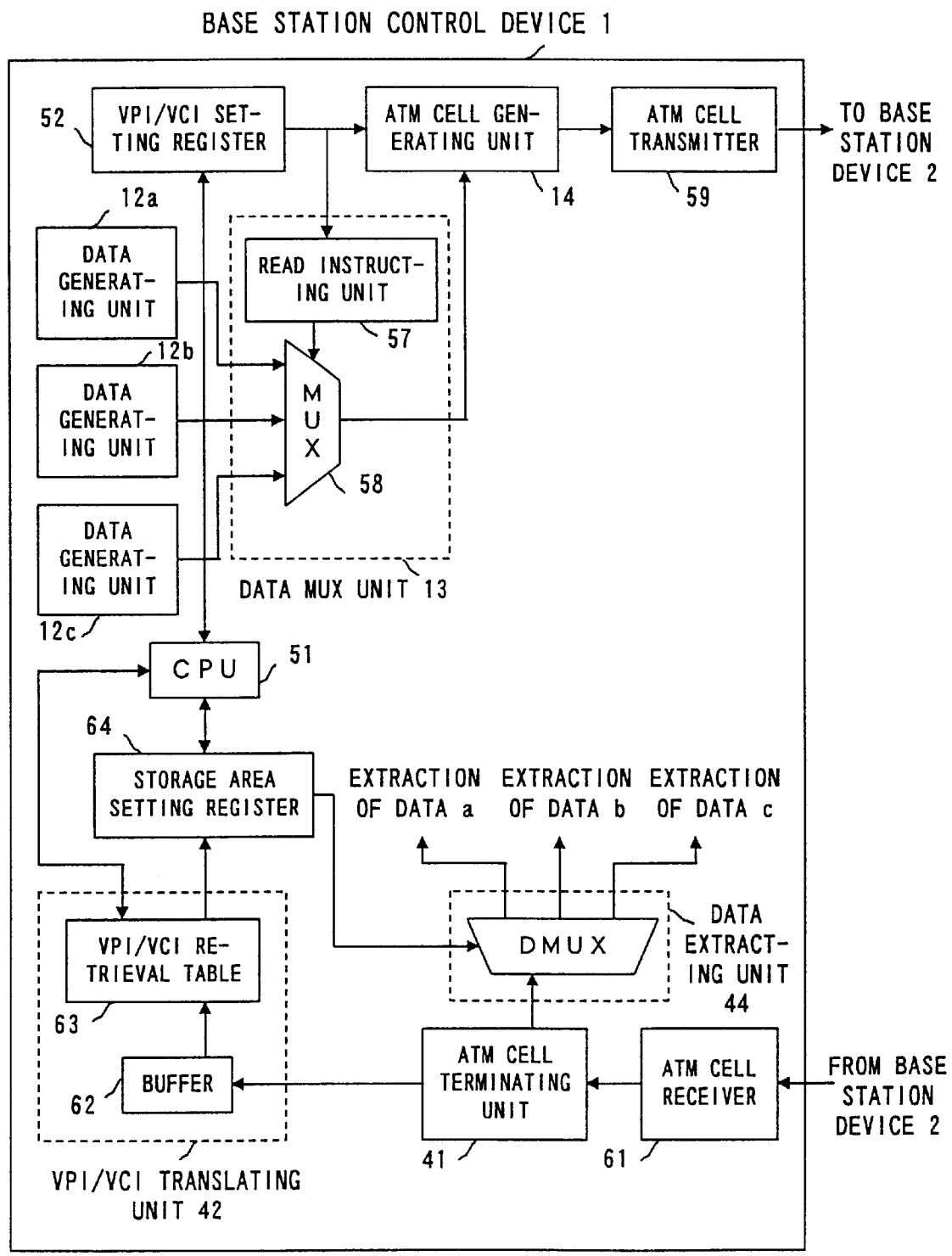
F I G. 8

| VPI/VCI | CORRESPONDING PATTERN |
|---|---|
| 00/0000 (hex) | $\begin{pmatrix} \text{FIRST AREA} \\ \text{SECOND AREA} \\ \text{THIRD AREA} \end{pmatrix} = \begin{pmatrix} 2A \\ 2B \\ 2C \end{pmatrix}$ |
| 00/0001 (hex) | $\begin{pmatrix} \text{FIRST AREA} \\ \text{SECOND AREA} \\ \text{THIRD AREA} \end{pmatrix} = \begin{pmatrix} 2C \\ 2A \\ 2B \end{pmatrix}$ |
| 00/0002 (hex) | $\begin{pmatrix} \text{FIRST AREA} \\ \text{SECOND AREA} \\ \text{THIRD AREA} \end{pmatrix} = \begin{pmatrix} 2B \\ 2C \\ 2A \end{pmatrix}$ |
| ⋮ | ⋮ |

FIG. 9

| CONNECTION PATTERN INDICATION (8 BITS) | RATIO INDICATION (4 BITS) | STORAGE LOCATION INDICATION (12 BITS) | DEVICE 2A DATA STORAGE LOCATION | DEVICE 2A NUMBER OF BYTES OF DATA | DEVICE 2B DATA STORAGE LOCATION | DEVICE 2B NUMBER OF BYTES OF DATA | DEVICE 2C DATA STORAGE LOCATION | DEVICE 2C NUMBER OF BYTES OF DATA |
|---|---|---|---|---|---|---|---|---|
| 00000001 | 0000 | 000000000000 | — | 48 | — | — | — | — |
| 00000010 | 0000 | 000000000000 | — | — | — | 48 | — | — |
| 00000100 | 0000 | 000000000000 | — | — | — | — | — | 48 |
| 00000011 | 0000 | 000000000000 | A | 24 | B | 24 | — | — |
|  |  | 000000000001 | B | 24 | A | 24 | — | — |
|  | 0001 | 000000000000 | A | 12 | B | 36 | — | — |
|  |  | 000000000001 | B | 36 | A | 12 | — | — |
|  | 0010 | 000000000000 | A | 8 | B | 40 | — | — |
|  |  | 000000000001 | B | 40 | A | 8 | — | — |
|  | 0011 | 000000000000 | A | 4 | B | 44 | — | — |
|  |  | 000000000001 | B | 44 | A | 4 | — | — |
| 00000101 | 0000 | 000000000000 | A | 24 | — | — | B | 24 |
|  |  | 000000000001 | B | 24 | — | — | A | 24 |
|  | 0001 | 000000000000 | A | 12 | — | — | B | 36 |
|  |  | 000000000001 | B | 36 | — | — | A | 12 |
|  | 0010 | 000000000000 | A | 8 | — | — | B | 40 |
|  |  | 000000000001 | B | 40 | — | — | A | 8 |
|  | 0011 | 000000000000 | A | 4 | — | — | B | 44 |
|  |  | 000000000001 | B | 44 | — | — | A | 4 |
| 00000110 | 0000 | 000000000000 | — | — | A | 24 | B | 24 |
|  |  | 000000000001 | — | — | B | 24 | A | 24 |
|  | 0001 | 000000000000 | — | — | A | 12 | B | 36 |
|  |  | 000000000001 | — | — | B | 36 | A | 12 |
|  | 0010 | 000000000000 | — | — | A | 40 | B | 40 |
|  |  | 000000000001 | — | — | B | 40 | A | 8 |
|  | 0011 | 000000000000 | — | — | A | 4 | B | 44 |
|  |  | 000000000001 | — | — | B | 44 | A | 4 |

FIG. 15

| CONNECTION PATTERN INDICATION | RATIO INDICATION | STORAGE LOCATION INDICATION | DEVICE 2A | | DEVICE 2B | | DEVICE 2C | |
|---|---|---|---|---|---|---|---|---|
| | | | DATA STORAGE LOCATION | NUMBER OF BYTES OF DATA | DATA STORAGE LOCATION | NUMBER OF BYTES OF DATA | DATA STORAGE LOCATION | NUMBER OF BYTES OF DATA |
| 000000111 | 0000 | 000000000000000 | A | 16 | B | 16 | C | 16 |
| | | 000000000000001 | A | 16 | C | 16 | B | 16 |
| | | 000000000000010 | B | 16 | A | 16 | C | 16 |
| | | 000000000000011 | B | 16 | C | 16 | A | 16 |
| | | 000000000000100 | C | 16 | A | 16 | B | 16 |
| | | 000000000000101 | C | 16 | B | 16 | A | 16 |
| | 0001 | 000000000000000 | A | 8 | B | 20 | C | 20 |
| | | 000000000000001 | A | 8 | C | 20 | B | 20 |
| | | 000000000000010 | B | 20 | A | 8 | C | 20 |
| | | 000000000000011 | B | 20 | C | 20 | A | 8 |
| | | 000000000000100 | C | 20 | A | 8 | B | 20 |
| | | 000000000000101 | C | 20 | B | 20 | A | 8 |
| | 0010 | 000000000000000 | A | 8 | B | 8 | C | 32 |
| | | 000000000000001 | A | 8 | C | 32 | B | 8 |
| | | 000000000000010 | B | 8 | A | 8 | C | 32 |
| | | 000000000000011 | B | 8 | C | 32 | A | 8 |
| | | 000000000000100 | C | 32 | A | 8 | B | 8 |
| | | 000000000000101 | C | 32 | B | 8 | A | 8 |
| | 0011 | 000000000000000 | A | 8 | B | 8 | C | 32 |
| | | 000000000000001 | A | 8 | C | 32 | B | 8 |
| | | 000000000000010 | B | 8 | A | 8 | C | 32 |
| | | 000000000000011 | B | 8 | C | 32 | A | 8 |
| | | 000000000000100 | C | 32 | A | 8 | B | 8 |
| | | 000000000000101 | C | 32 | B | 8 | A | 8 |

FIG. 16

H : HEADER

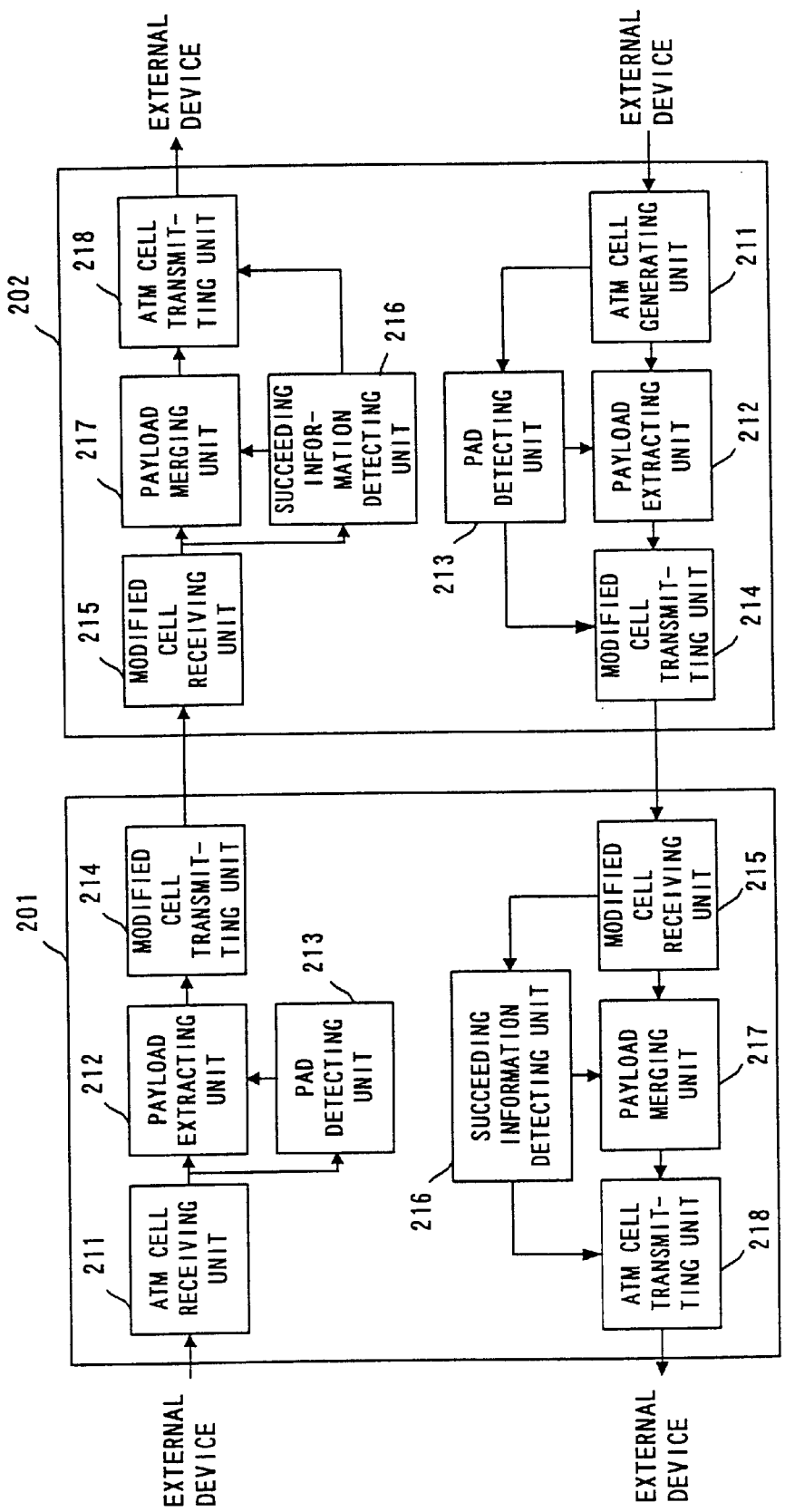
F I G. 25

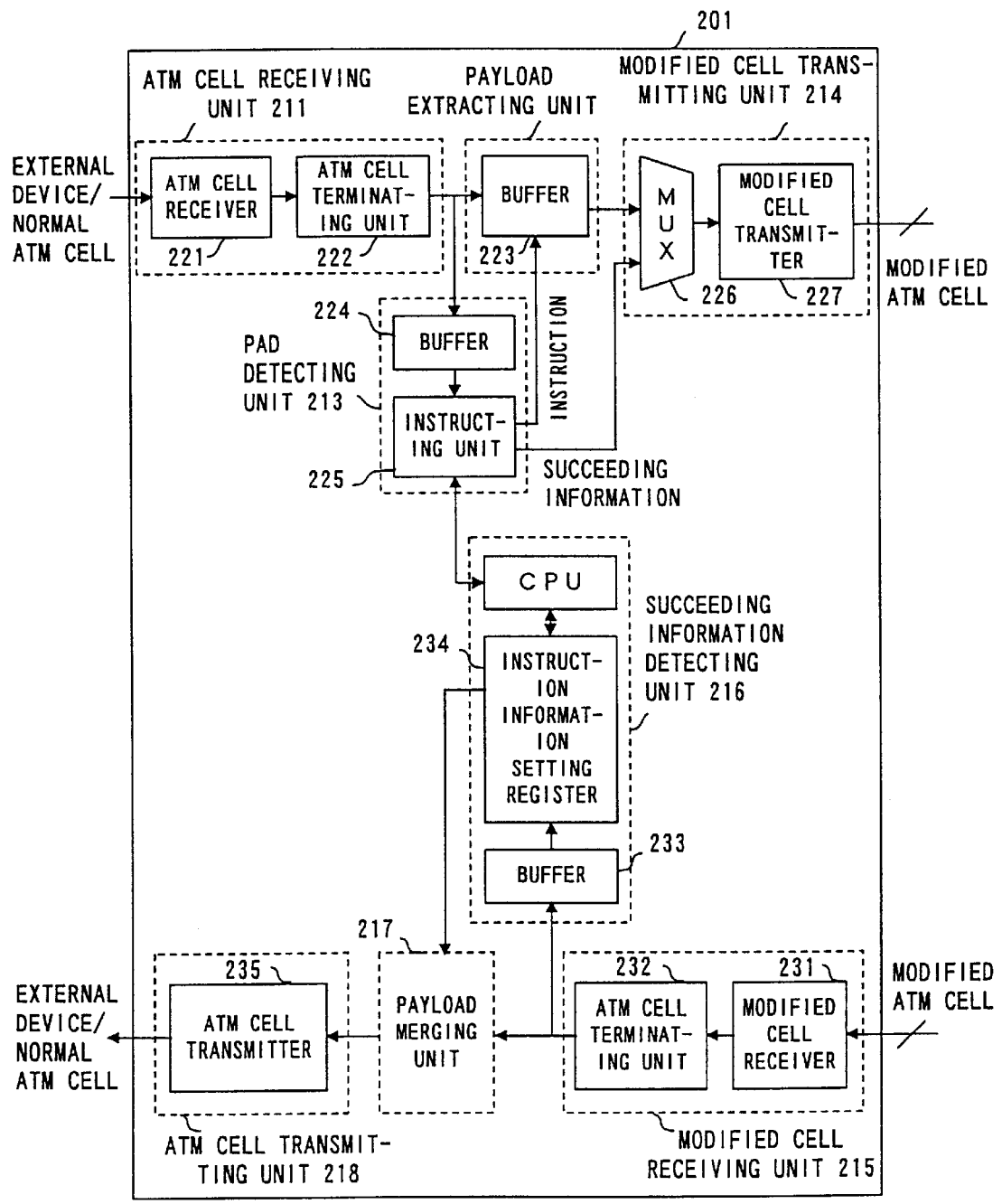
F I G. 2 6

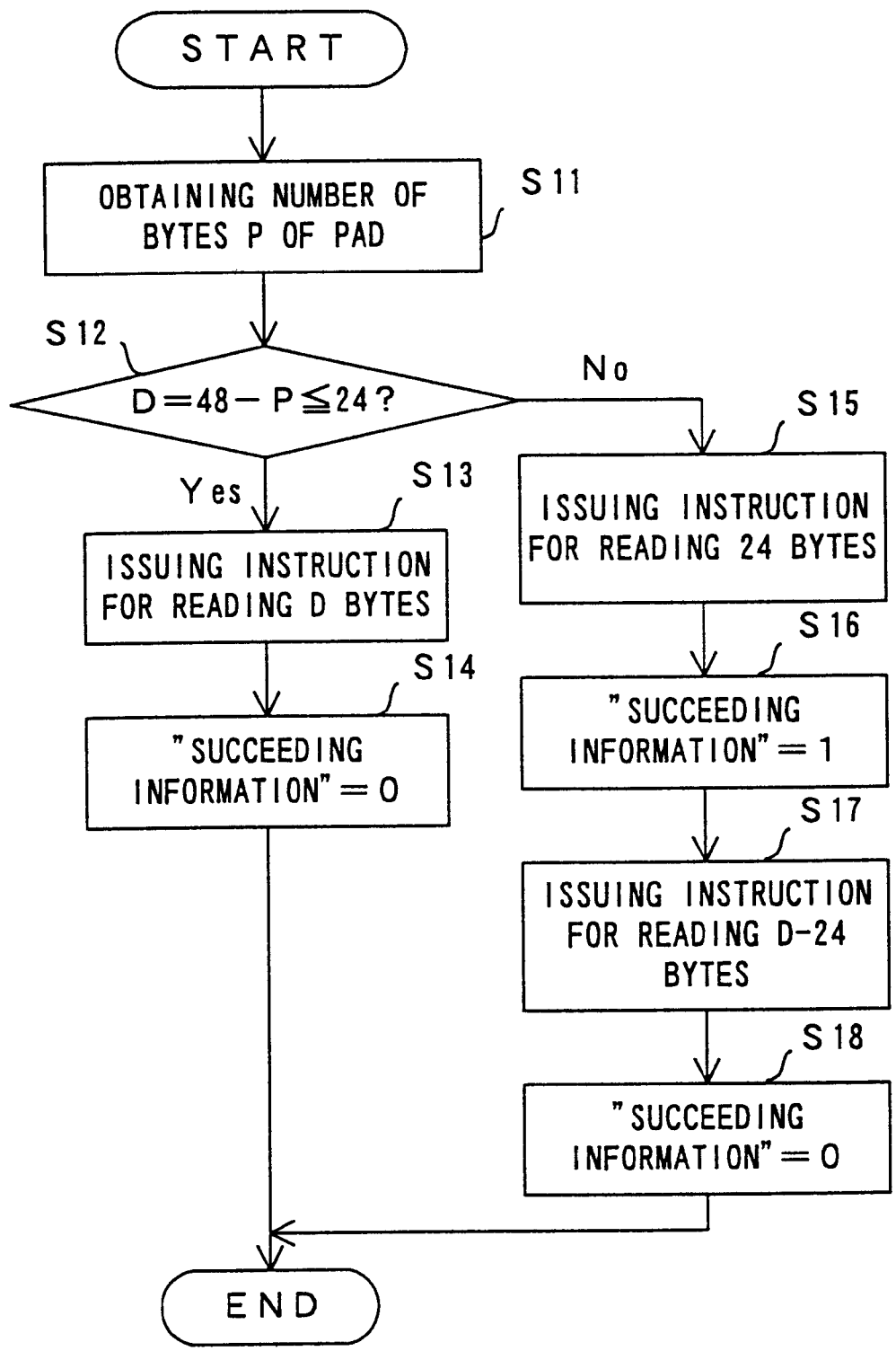
F I G. 2 7

DATA TRANSMISSION METHOD AND SYSTEM

BACKGROUND OF THE INVENTION

1. Field of the Invention

The present invention relates to a method and a system for storing data in a fixed-length packet and for transmitting the packet, and more particularly to an ATM system.

2. Description of the Related Art

An ATM is becoming popular as one of principal techniques of current communications systems, and promises to be used wider in the future.

FIG. 1 exemplifies a network using the ATM. Here, the ATM is used for a mobile communications system. Normally, respective mobile terminals 501-1 through 501-3 wirelessly transmit/receive data (including speech data) to/from their nearest base station devices. Base station devices 502-1 through 502-3 are respectively connected to a base station control device 503, and transmit/receive data to/from the mobile terminals 501-1 through 501-3 according to the control from the base station control device 503. The base station control device 503 is accommodated by a mobile exchange 504, which is intended to exchange data within the mobile communications system. Additionally, the mobile exchange 504 is connected to an exchange network 505 in order to allow data to be transmitted and received between the mobile communications system and a different network. In the system having the above described configuration, data are stored in fixed-length packets, which are referred to as cells, and transferred between the base station devices 502-1 through 502-3 and the base station control device 503, between the base station control device 503 and the mobile exchange 504, between the mobile exchange 504 and the exchange network 505, and within the exchange network 505.

FIG. 2 shows the format of an ATM cell. Here, the format of a UNI (User Network Interface) is depicted. The ATM cell is fundamentally a fixed-length packet of 53 bytes, and is composed of a 5-byte header and a 48-byte payload. The header is composed of a GFC (Generic Flow Control) arranged for preventing cells from colliding with each other at an interface, a VPI (Virtual Path Identifier) for identifying a virtual path, a VCI (Virtual Channel Identifier) for identifying a virtual channel set on a virtual path, a PT (Payload Type) for identifying the type of information stored in a payload, a CLP (Cell Loss Priority) for indicating a priority of a cell, and an HEC (Header Error Control) for detecting an error of header data. The payload stores data to be transmitted.

Note that the format of an ATM cell of an NNI (Network Network Interface) is fundamentally the same as that of the UNI. However, the GFC is not arranged in this NNI format, and additionally, 12 bits are assigned to the VPI.

The base station devices 502-1 through 502-3 respectively have a CLAD (Cell Assembly and Disassembly) capability. The CLAD capability is a capability for assembling a cell by partitioning digital data into 48-byte blocks and by respectively attaching headers to the partitioned 48-byte blocks, and for extracting the data from the payloads of the respective cells. That is, each of the base station devices 502-1 through 502-3 stores the data received from a mobile terminal in a payload of a cell and transfers the cell to the base station control device 503, and transfers the data stored in the payload of the cell received from the base station control device 503 to a mobile terminal at a call destination. The VPIs/VCIs between the base station control device 503 and the base station devices 502-1 through 502-3 are assigned, for example, by the base station control device 503.

Upon receiving a cell from any of the base station devices 502-1 through 502-3, the base station control device 503 transfers the cell to the mobile exchange 504. Upon receiving a cell from the mobile exchange 504, the base station control device 503 transfers the cell to the base station device corresponding to the VPI/VCI assigned to the header of the cell. The mobile exchange 504 transfers the cell to a base station control device 503 or exchange network 505 based on the VPI/VCI assigned to the header of the received cell. FIG. 1 illustrates only one base station control device. Actually, however, a plurality of base station control devices are accommodated by the mobile exchange 504.

With the above described system, data transferred between mobile terminals or data transferred between a mobile terminal and a different terminal are transmitted by the ATM.

As described above, data are stored in cells and transmitted in the ATM. Fundamentally, data to be transmitted is partitioned into 48-byte blocks, and the respectively partitioned data are sequentially stored in the payloads of cells.

By the way, particularly in mobile communications, data to be transmitted is compressed in order to save network resources (such as a frequency band in this case). Accordingly, for example, the transfer rate of speech data such as a conversation, etc. is considerably low.

If respective cells are transmitted every time the payload of each of the cells is filled with the data to be transmitted in the case where such low-speed data is transmitted by using the ATM, the time intervals at which cells are transmitted become longer as a matter of course, which leads to a data transmission delay. The data transmission delay must be prevented particularly when speech or image data is transmitted, as is well known.

A method for transmitting a cell before its payload is filled with data to be transmitted is known as a method for preventing the above described delay. Specifically, for example, an interval at which a cell is transmitted is predetermined, and the data received from the transmission timing of the immediately previous cell and until the transmission timing of the present cell is stored in the payload, and data (dummy data) referred to as a pad (padding) is stored in the remaining area of the payload as shown in FIG. 3, when the cell is transmitted. The cell whose payload partially includes a pad is transmitted. The pad is, for example, data in which all of bits are 0.

As described above, if the method for transmitting a cell before its payload is filled with data to be transmitted is adopted, a delay problem can be overcome. However, because dummy data are transmitted included with data to be transmitted in this method, the transmission efficiency of data is degraded.

Although this problem is significant when the transfer rate of data to be transmitted is low, it may occur even when the transfer rate is high. Additionally, this is not a problem occurring only in speech data.

SUMMARY OF THE INVENTION

An object of the present invention is to improve data transmission efficiency in a system for storing data in a fixed-length packet and for transmitting the packet.

A data transmission method according to the present invention is performed in a system for transmitting data by using a fixed-length packet from a transmitting device to a plurality of receiving devices. This method comprises the steps of: allocating the data storage area of the fixed-length packet to one or more of the plurality of receiving devices; storing only data to be transmitted to the one or more receiving devices to which the data storage area of the fixed-length packet is allocated in a corresponding partitioned area of the fixed-length packet; storing the allocation information indicating an allocation pattern of the data storage area of the fixed-length packet in the header of the fixed-length packet; transmitting the fixed-length packet from the transmitting device to the plurality of receiving devices; and extracting data from the data storage area of the fixed-length packet based on the allocation information stored in the header of the fixed-length packet, within each of the receiving devices.

With the above described method, a transmitting device can transmit a plurality of data sets, which are unique, to a plurality of receiving devices by using a single fixed-length packet. Since the data storage area of the fixed-length packet is shared by the plurality of receiving devices at this time, there is no need to store invalid (dummy) data in order to prevent a transmission delay. Accordingly, data transmission efficiency can be improved while preventing a transmission delay. Additionally, only data to be transmitted to receiving devices are stored in the data storage area of a fixed-length packet, so that an overhead becomes smaller and the data transmission efficiency can be increased.

A data transmission method in a second aspect of the present invention is performed in a system for transmitting data by using a fixed-length packet from a plurality of transmitting devices, which are connected in series, to a receiving device. This data transmission method comprises the steps of: allocating the data storage area of the fixed-length packet to one or more of the plurality of transmitting devices; storing the allocation information indicating the pattern for allocating the data storage area to the plurality of transmitting devices in the header of the fixed-length packet; storing the data to be transmitted to the receiving device in the data storage area of the fixed-length packet based on the allocation information stored in the header of the fixed-length packet at each of the transmitting devices, when the fixed-length packet is transmitted to the receiving device sequentially via the plurality of transmitting devices; and extracting data for each of the transmitting devices from the data storage area of the fixed-length packet based on the allocation information stored in the header of the fixed-length packet, within the receiving device.

With the above described method, a plurality of transmitting devices can transmit data to a receiving device by using a single fixed-length packet. Since the data storage area of the fixed-length packet is shared by the plurality of transmitting devices at this time, there is no need to store invalid (dummy) data in order to prevent a transmission delay. Accordingly, data transmission efficiency can be improved while preventing a transmission delay.

A data transmission method in a third aspect of the present invention is performed by a system for transmitting data from a first device to a second device arranged in a network that transfers a first fixed-length packet. This method comprises the steps of: the first device extracting valid data stored in the data storage area of the first fixed-length packet when the first device receives the first fixed-length packet to be transmitted to the second device, the first device storing the extracted valid data in the data storage area of a second fixed-length packet, and the first device transmitting the second fixed-length packet to the second transmitting device.

With the above described method, data are transferred between the first and the second devices by using the second fixed-length packet which is sorter than the first fixed-length packet, so that the amount of invalid data to be transmitted can be reduced and the data transmission efficiency can be improved.

BRIEF DESCRIPTION OF THE DRAWINGS

FIG. 6 explains the outline of the data transmission method according to the first preferred embodiment;

FIG. 8 is a block diagram showing the details of the base station control device according to the first preferred embodiment;

FIG. 9 exemplifies a VPI/VCI table;

FIG. 15 exemplifies a table (No. 1) for storing allocation pattern information;

FIG. 16 exemplifies a table (No. 2) for storing allocation pattern information;

FIG. 25 is a block diagram showing the configurations of transmitting devices according to the third preferred embodiment;

FIG. 26 is a block diagram showing the details of the transmitting device according to the third preferred embodiment;

FIG. 27 is a flowchart showing the process performed by an instructing unit.

DETAILED DESCRIPTION OF THE INVENTION

Figure 1:
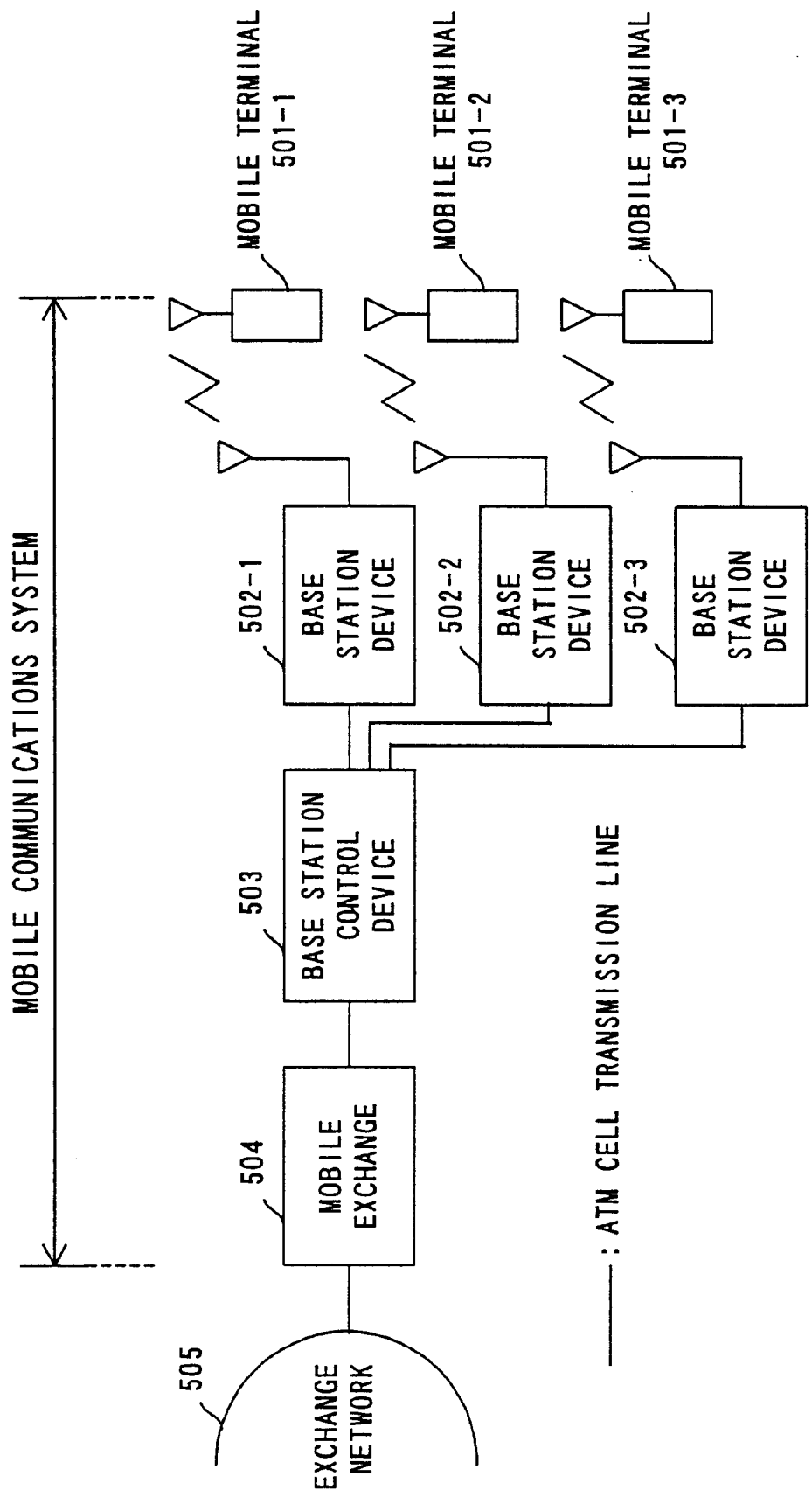
FIG. 1 exemplifies a network using an ATM.

Provided below is the explanation about preferred embodiments according to the present invention, by referring to the drawings. The explanation is provided below by employing an ATM network as one of networks for transmitting a fixed-length packet.

Figure 4:
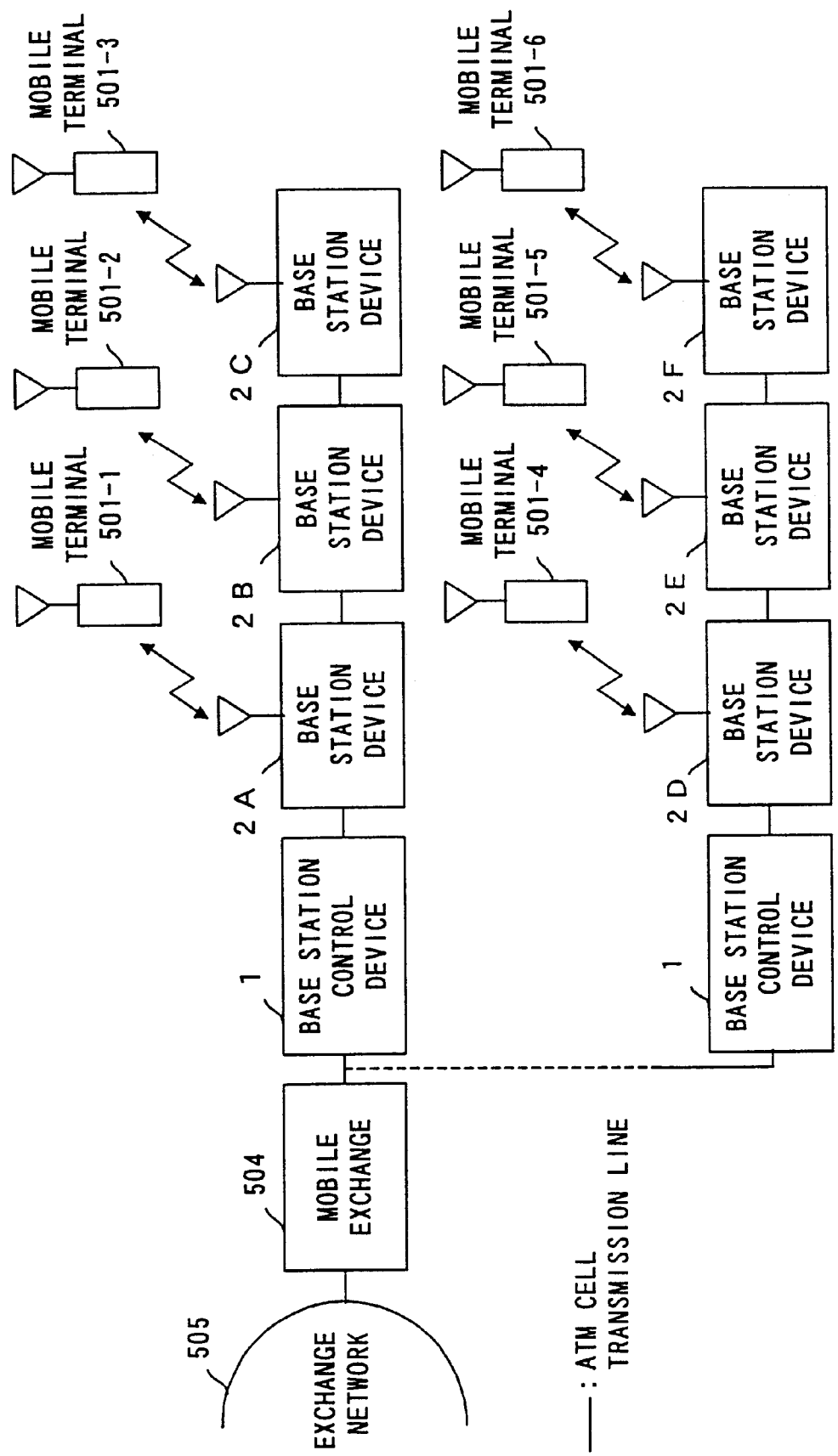
FIG. 4 shows the configuration of a system to which data transmission methods according to a first and a second preferred embodiment are applied.

FIG. 4 shows the configuration of a system to which data transmission methods according to a first and a second preferred embodiment are applied. In this figure, the same reference numerals as those shown in FIG. 1 indicate the same constituent elements. A base station control device 1 and base station devices 2A through 2F respectively correspond to the base station control device 502 and the base station devices 502-1 through 502-3, which are shown in FIG. 1. Their fundamental capabilities are the same as those of FIG. 1. Note that, however, the base station control device 1 and the base station devices 2A through 2F has a capability for multiplexing data in the payload of a single cell. Hereinafter, an arbitrary one of a plurality of base station devices (in FIG. 4, the base station devices 2A through 2F) is simply referred to as a base station device 2 in some cases.

With the systems according to the first and second preferred embodiments, a plurality of base station devices 2, which are connected in series, are connected to a base station control device 1 as shown in FIG. 4. For example, three base station devices 2A through 2C, which are connected in series, form one group. One of the base station devices 2 within the group (in the preferred embodiments, the base station device 2A) is connected to the base station control device 1. Details of the first and second preferred embodiments will be explained below.

First Preferred Embodiment

A method according to the first preferred embodiment provides a capability for storing a plurality of data sets, which are involved in individual communications with each other, in a payload of a single cell, and for transmitting the cell.

Figure 2:
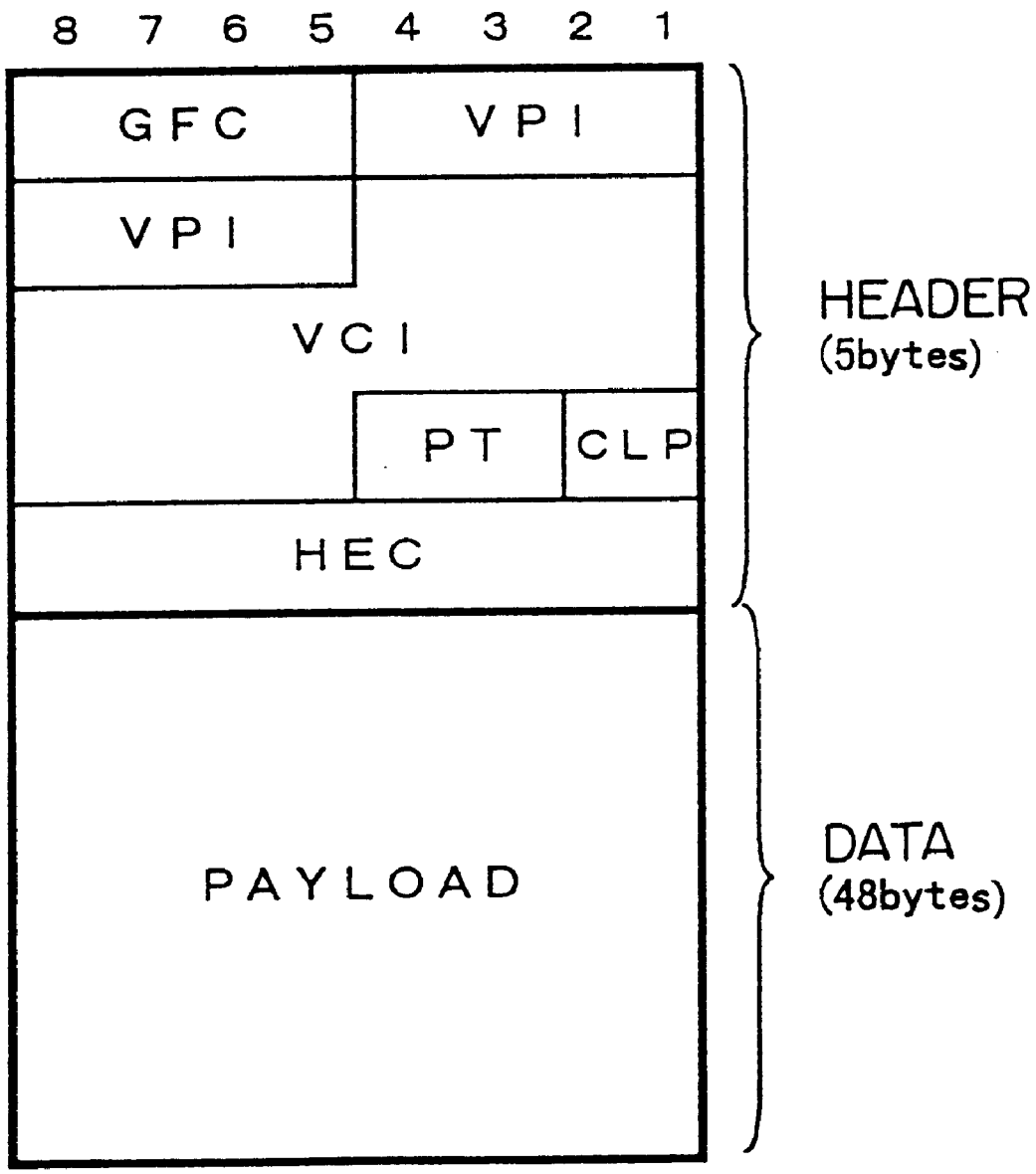
FIG. 2 shows the format of an ATM cell.
Figure 3:
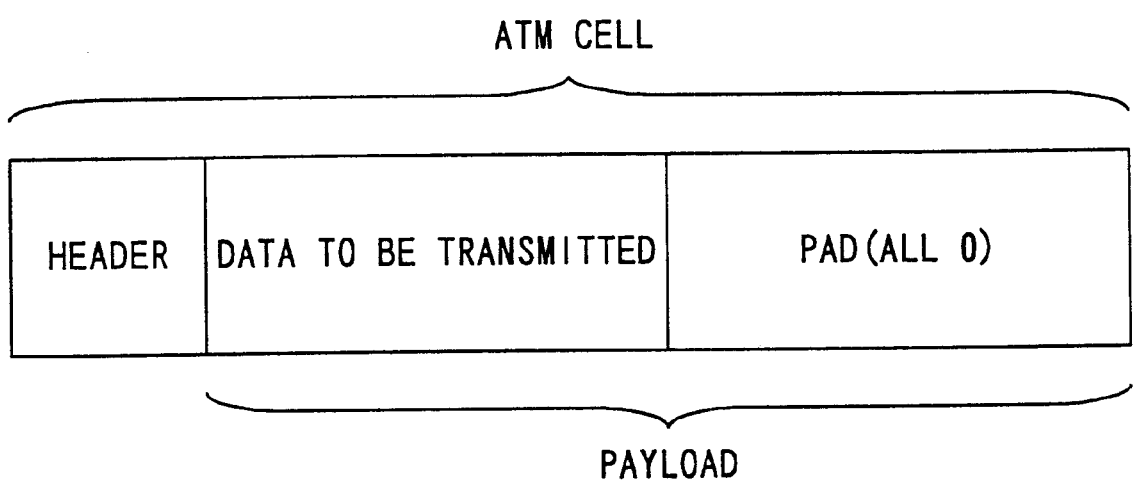
FIG. 3 shows the ATM cell whose payload partially stores a pad.
Figure 5:
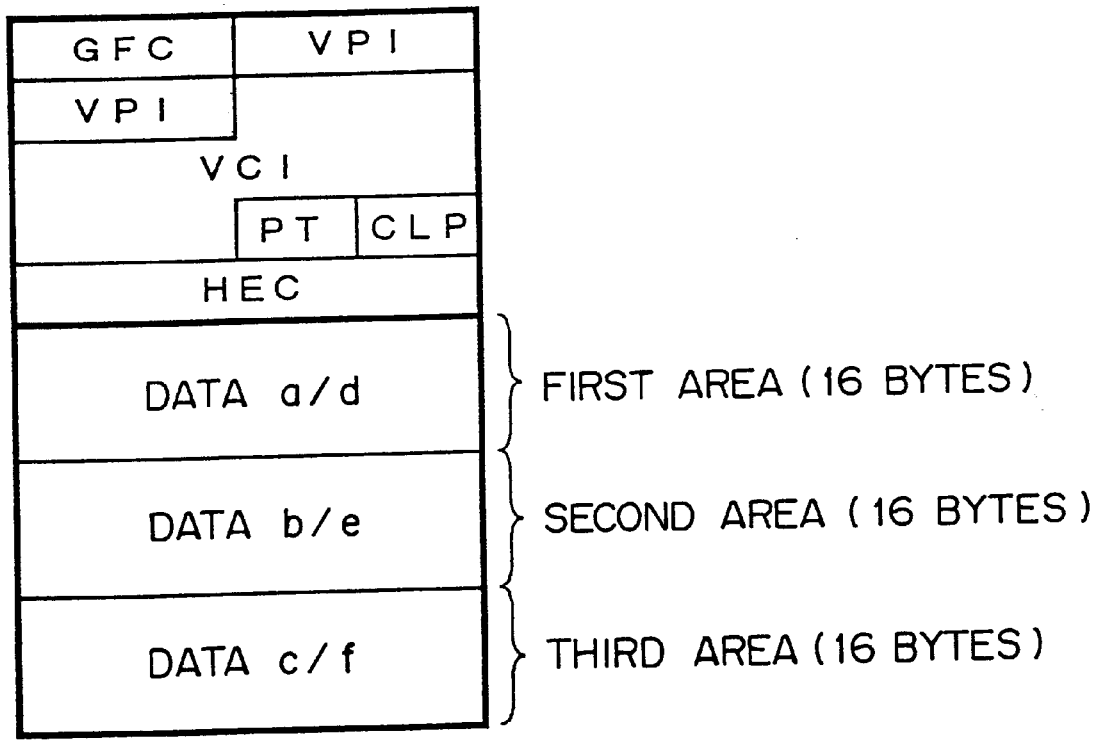
FIG. 5 shows the structure of the cell transferred between a base station control device and base station devices in the first preferred embodiment.

FIG. 5 shows the structure of a cell transferred between the base station control device 1 and the base station devices 2 in the first preferred embodiment. Here, it is assumed that three base station devices 2A through 2C are connected to one base station control device 1. The header of this cell is the same as that of a normal ATM cell. It is composed of a GFC, a VPI/VCI (a combination of a VPI and a VCI), a PT, a CLP, and an HEC, as explained by referring to FIG. 2. Its payload is partitioned into three areas (the first through third areas). Each of the areas is composed of 16 bytes, and is allocated to each of the base station devices 2A through 2C.

FIG. 6 explains the outline of the data transmission method according to the first preferred embodiment. The base station control device 1 transmits the cell shown in FIG. 5 to the base station device 2A. Here, the first through third areas of the payload are respectively allocated to the base station devices 2A through 2C. That is, the base station control device 1 partitions the data to be transmitted to the base station devices 2A through 2C into 16-byte blocks, respectively stores the data blocks in the first through third areas, and transmits the cell to the base station device 2A. In this way, data involved in a plurality of communications are stored (multiplexed) in a single cell. Hereinafter, a cell which stores data involved in a plurality of communications in the above described way is sometimes referred to as a multiplexed cell.

As the VPI/VCI assigned to the header of the above described cell, a predetermined value (indicating that a corresponding cell is a multiplexed cell) is used. In FIG. 6, VPI/VCI=00/0000 (hex).

Upon receipt of a cell from the base station control device 1, the base station device 2A transmits the received cell to the base station device 2B after copying the cell and stores the copied cell in the local device itself. The base station device 2A identifies the data to be extracted from the cell based on the VPI/VCI of the received cell. Here, if the base station device 2A detects VPI/VCI=00/0000 (hex), it extracts the data stored in the first area within the payload of the cell. In this way, the base station device 2A obtains data 'a'. Remember that the correspondence between the VPI/VCI and the area from which data is to be extracted is preset for each base station device 2.

Upon receipt of the cell from the base station device 2A, the base station device 2B transmits the received cell to the base station device 2C after copying the cell and stores the copied cell in the local device itself. Likewise the base station device 2A, the base station device 2B identifies the data to be extracted from the cell based on the VPI/VCI of the received cell. Here, if the base station device 2B detects VPI/VCI=00/0000 (hex), it extracts the data stored in the second area within the payload of the cell. In this way, the base station device 2B obtains data 'b'.

Upon receipt of the cell from the base station device 2B, the base station device 2C identifies the data to be extracted from the cell based on the VPI/VCI of the received cell, and likewise with other base station devices 2A or 2B. Here, if the base station device 2C detects VPI/VCI=00/0000 (hex), it extracts the data stored in the third area within the payload of the cell. In this way, the base station device 2C obtains data 'c'.

As described above, the base station control device 1 can transmit the data to the plurality of base station devices 2A through 2C in the first preferred embodiment. This data transmission is different from a conventional multicast communication in the following point. Namely, the same data is transmitted to a plurality of devices in the conventional multicast communication, while data transmitted to a plurality of devices are unique in the first preferred embodiment.

Provided next is the explanation about the example in which data is transmitted from the base station device 2 to the base station control device 1. Also in this case, 00/0000 (hex) is used between the base station control device 1 and the base station device 2 as the VPI/VCI indicating that a cell to be transmitted is a multiplexed cell.

The base station device 2C partitions the data to be transmitted to the base station control device 1 into 16-byte blocks. Upon identification of the VPI/VCI to be used, the base station device 2C stores the data to be transmitted (data f) in the third area within the payload of the cell.

Additionally, the base station device 2C stores a pad in the first and second areas. Then, this cell is transmitted to the base station device 2B.

Upon receipt of the cell from the base station device 2C, the base station device 2B identifies the area for storing the data (data e) to be transmitted to the base station control device 1 based on the VPI/VCI of the received cell. Here, if the base station device 2B detects VPI/VCI=00/0000 (hex), it stores the data to be transmitted in the second area within the payload of the cell. This cell is then transmitted to the base station device 2A.

Upon receipt of the cell from the base station device 2B, the base station device 2A identifies the area for storing the data (data d) to be transmitted to the base station control device 1 based on the VPI/VCI of the received cell. Here, if the base station device 2A detects VPI/VCI=00/0000 (hex), it stores the data to be transmitted in the first area within the payload of the cell. In this way, the data d, e, and f, which are respectively transmitted from the base station devices 2A, 2B, and 2C, are stored in the first through third areas within the payload of the cell transmitted from the base station device 2A to the base station control device 1. This cell is then transmitted to the base station control device 1.

Upon receipt of the cell from the base station device 2A, the base station control device 1 identifies the transmission sources of the data respectively stored in the first through third areas within the payload based on the VPI/VCI of the received cell. Here, if the base station control device 1 detects VPI/VCI=00/0000 (hex), it identifies that the transmission sources of the data stored in the first through third areas within the payload of the cell are the base station devices 2A, 2B, and 2C, respectively. The base station control device 1 then extracts the data from the respective areas of the payload, and performs the processes corresponding to the respective transmission sources.

As described above, a single cell is shared by the plurality of base station devices 2A through 2C in communications made between the base station control device 1 and the base station devices 2A through 2C in the first preferred embodiment.

Figure 7:
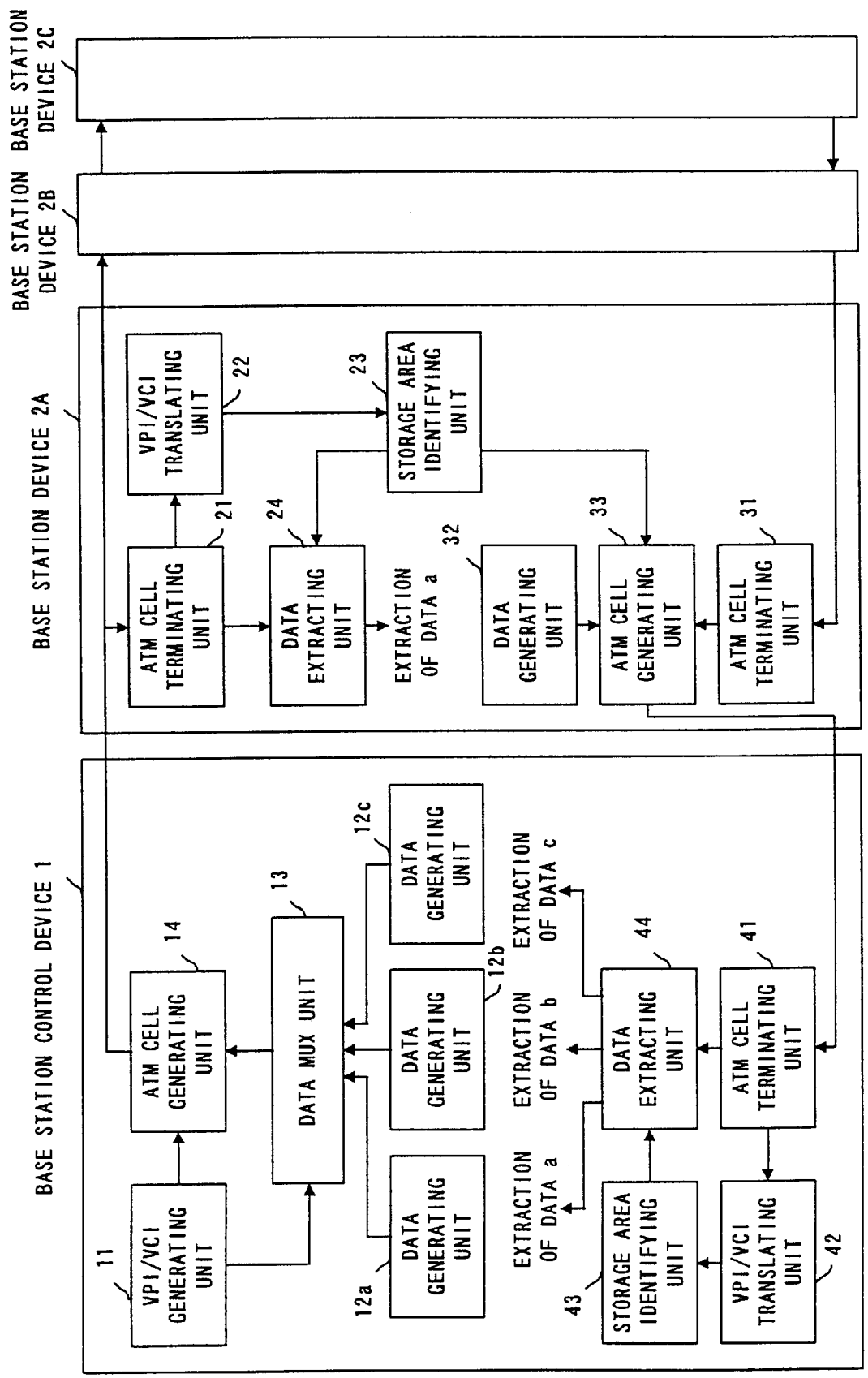
FIG. 7 is a block diagram showing the configurations of the base station control device and the base station devices according to the first preferred embodiment.

FIG. 7 is a block diagram showing the configurations of the base station control device 1 and the base station device 2 according to the first preferred embodiment. The configurations of the base station devices 2A through 2C are the same.

A VPI/VCI generating unit 11 generates the VPI/VCI assigned to the cell to be transmitted to the base station device 2. Data generating units 12a through 12c generate data to be transmitted to the base station devices 2A through 2C. A data MUX unit 13 multiplexes the data generated by the data generating units 12a through 12c according to the VPI/VCI generated by the VPI/VCI generating unit 11. Assuming that VPI/VCI=00/0000 (hex) is generated by the VPI/VCI generating unit 11, the data MUX unit 13 respectively obtains 16 bytes from the data generated by the data generating units 12a through 12c, and outputs the obtained data to the ATM cell generating unit 14. The ATM cell generating unit 14 generates an ATM cell by storing the data received from the data MUX unit 13 in the payload, and by attaching a header including the VPI/VCI generated by the VPI/VCI generating unit 11.

With the above described configuration, the base station control device 1 can store data involved in a plurality of communications in the payload of a single cell.

An ATM cell terminating unit 21 terminates a received cell, and stores the terminated cell. A VPI/VCI translating unit 22 extracts the VPI/VCI stored in the header of the cell stored by the ATM cell terminating unit 21, and analyzes the extracted VPI/VCI. A storage area identifying unit 23 identifies the data storage area allocated to the local device itself (in FIG. 7, the base station device 2A) according to the VPI/VCI extracted by the VPI/VCI translating unit 22. For example, if VPI/VCI=00/0000 (hex) is detected, the storage area identifying unit 23 identifies the "first area". The storage area identifying unit 23 then notifies a data extracting unit 24 and an ATM cell generating unit 33 of the identified area as area information. The data extracting unit 24 reads the data from the payload of the cell stored by the ATM cell terminating unit 21 according to the area information notified from the storage area identifying unit 23.

With the above described configuration, the base station device 2 can extract the data addressed to the local device itself from the cell in which data involved in a plurality of communications are stored.

An ATM cell terminating unit 31 terminates a received cell, and stores the terminated cell. A data generating unit 32 generates the data to be transmitted to the base station control device 1. An ATM cell generating unit 33 extracts a required amount of data from the data generated by the data generating unit 32 based on the area information notified from the storage area identifying unit 23. Then, the ATM cell generating unit 33 stores the data obtained from the data generating unit 32 in the area instructed by the area information within the payload of the cell stored by the ATM cell terminating unit 31.

With the above described configuration, the base station device 2 can store the data to be transmitted in the area designated by the VPI/VCI used between the base station control device 1 and the base station device 2.

An ATM terminating unit 41, a VPI/VCI translating unit 42, a storage area identifying unit 43, and a data extracting unit 44 are fundamentally the same as the ATM terminating unit 21, the VPI/VCI translating unit 22, the storage area identifying unit 23, and the data extracting unit 24, which are included by the base station device 2. Notice that, however, the base station control device 1 extracts all the data stored in the payload, and identifies the transmission sources of the data for respective areas. This capability is implemented by the storage area identifying unit 43 and the data extracting unit 44.

With the above described configuration, the base station control device 1 can extract the data involved in a plurality of communications from a received cell by making identification between them.

In the above described system, the cell transmitted from the base station devices 2A through 2C to the base station control device 1 is generated by the base station device 2C, and reaches the base station control device 1 via the base station devices 2B and 2A. At this time, the VPI/VCI of this cell is assigned by the base station device 2C. The base station device 2C utilizes the VPI/VCI used by the cell received from the base station control device 1 as it is.

FIG. 8 is a block diagram showing the details of the base station control device 1. That is, FIG. 8 illustrates the details of the base station control device 1 shown in FIG. 7.

The VPI/VCI generating unit 11 shown in FIG. 7 is composed of a CPU 51 and a VPI/VCI setting register 52. The CPU 51 identifies the number of base station devices 2 connected to the base station control device 1 and their connection order. Additionally, the CPU 51 comprises a VPI/VCI table shown in FIG. 9. This VPI/VCI table stores the correspondence between the VPI/VCI assigned to the cell to be transmitted to the base station device 2 and the allocation pattern of the payload of the cell. For example, if the payload of a cell is partitioned into three areas and the first through third areas are allocated to the respective base station devices 2A through 2C, the information that VPI/VCI=00/0000 (hex) is assigned to that cell is set in the VPI/VCI table.

When transmitting the data to be transmitted to the base station devices 2A through 2C with a multiplexed cell, the CPU 51 determines the allocation pattern of the payload. The CPU 51 then writes the VPI/VCI corresponding to the determined allocation pattern to the VPI/VCI setting register 52. Note that the CPU 51 has a capability for notifying the base station devices 2A through 2C of the contents of the VPI/VCI table shown in FIG. 9.

Figure 10:
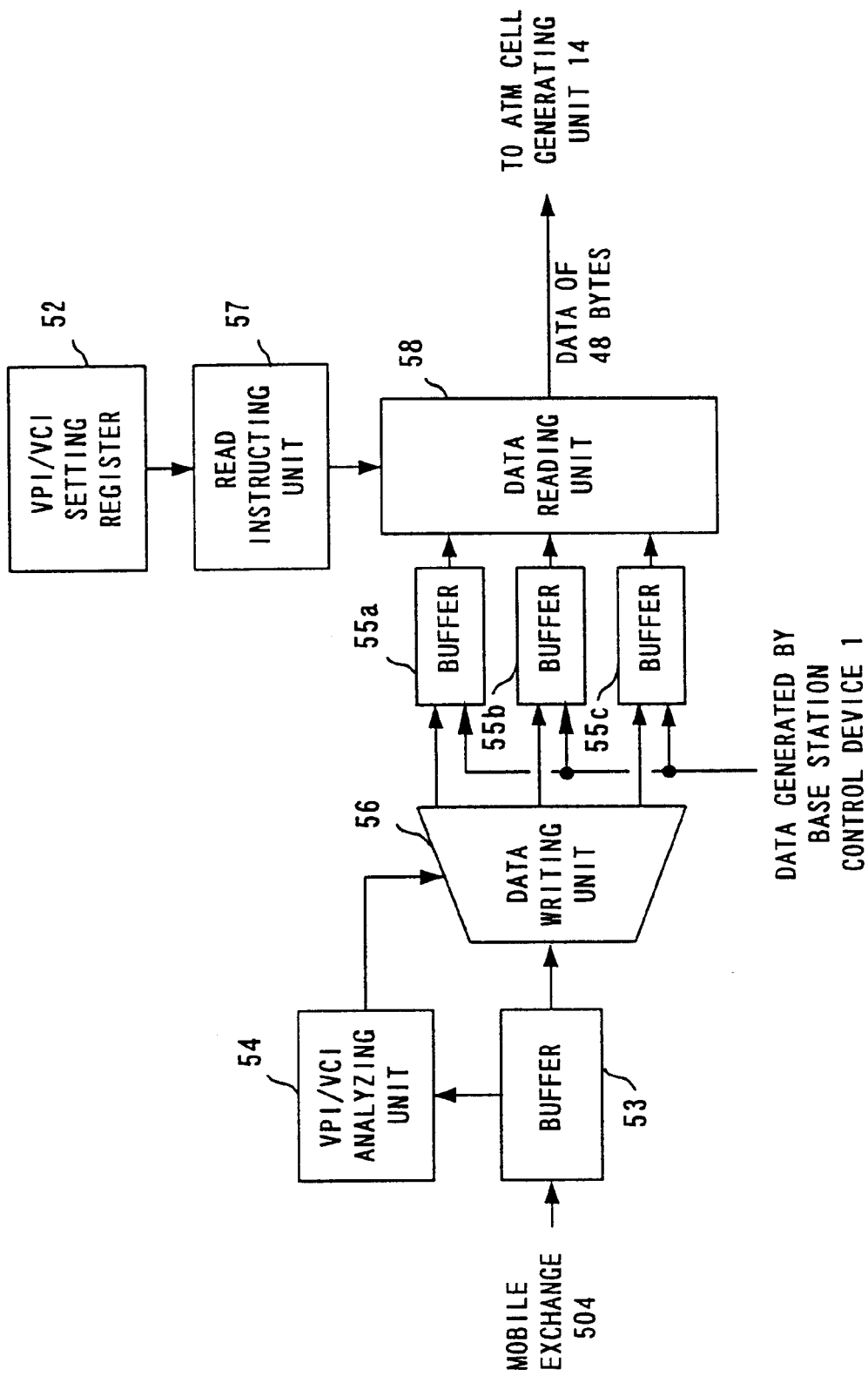
FIG. 10 shows the configurations of a data generating unit and a data MUX unit.

FIG. 10 shows the configurations of the data generating units 12a through 12c and the data MUX unit 13. A buffer 53 stores the cell received from a mobile exchange 504. A VPI/VCI analyzing unit 54 analyzes the VPI/VCI of the cell stored in the buffer 53, and identifies the transmission destination of the cell. Buffers 55a through 55c respectively store the data to be transmitted to the base station devices 2A through 2C. A data writing unit 56 writes the data included in the payload of the cell stored in the buffer 53 to one of the buffers 55a through 55c, based on the result of the identification made by a VPI/VCI analyzing unit 54. For example, upon receipt of the cell from the mobile exchange 504 to the base station device 2A, the data writing unit 56 writes the data stored in the payload of the cell to the buffer 55a. Not only the data that the mobile exchange 504 stores in a cell, but also the data that the base station control device 1 generates can be written to the buffers 55a through 55c.

A read instructing unit 57 issues a read instruction to a data reading unit 58 based on the VPI/VCI set in the VPI/VCI setting register 52. This read instruction is intended to designate the buffer to be accessed and the amount of data (the number of bytes) to be read. Assuming that VPI/VCI=00/0000 (hex) is set in the VPI/VCI setting register 52, the read instruction becomes as follows.

(1) Reading 16 bytes of data from the buffer 55a.
(2) Reading 16 bytes of data from the buffer 55b after step (1)
(3) Reading 16 bytes of data from the buffer 55c after step (2)

A data reading unit 58 reads the data from the buffers 55a through 55c according to the read instruction issued from the read instructing unit 57, and outputs the read data. The output of the data reading unit 58 is 48-byte data.

An ATM cell generating unit 14 generates a cell by attaching a header including the VPI/VCI set in the VPI/VCI setting register 52 to the 48-byte data output from a data MUX unit 13. In this case, the 48-byte data output from the data MUX unit 13 is stored in the payload of the cell. An ATM cell transmitter 59 transmits the cell generated by the ATM cell generating unit 14 to the base station device 2.

After the cell from the base station device 2 is received by an ATM cell receiver 61, it is terminated by an ATM cell terminating unit 41. An HEC calculation is made by the ATM cell terminating unit 41. The VPI/VCI assigned to the received cell are written to the buffer 62 of a VPI/VCI translating unit 42, and the payload of that cell is provided to a data extracting unit 44.

The VPI/VCI translating unit 42 determines whether or not the received cell is a multiplexed cell, by analyzing the VPI/VCI written to the buffer 62. A VPI/VCI retrieval table 63 is fundamentally the same as the VPI/VCI table shown in FIG. 9, and is set by the CPU 51. The VPI/VCI translating unit 42 references the retrieval table 63, and writes the allocation pattern corresponding to the VPI/VCI written to the buffer 62 in a storage area setting register 64.

Figure 11:
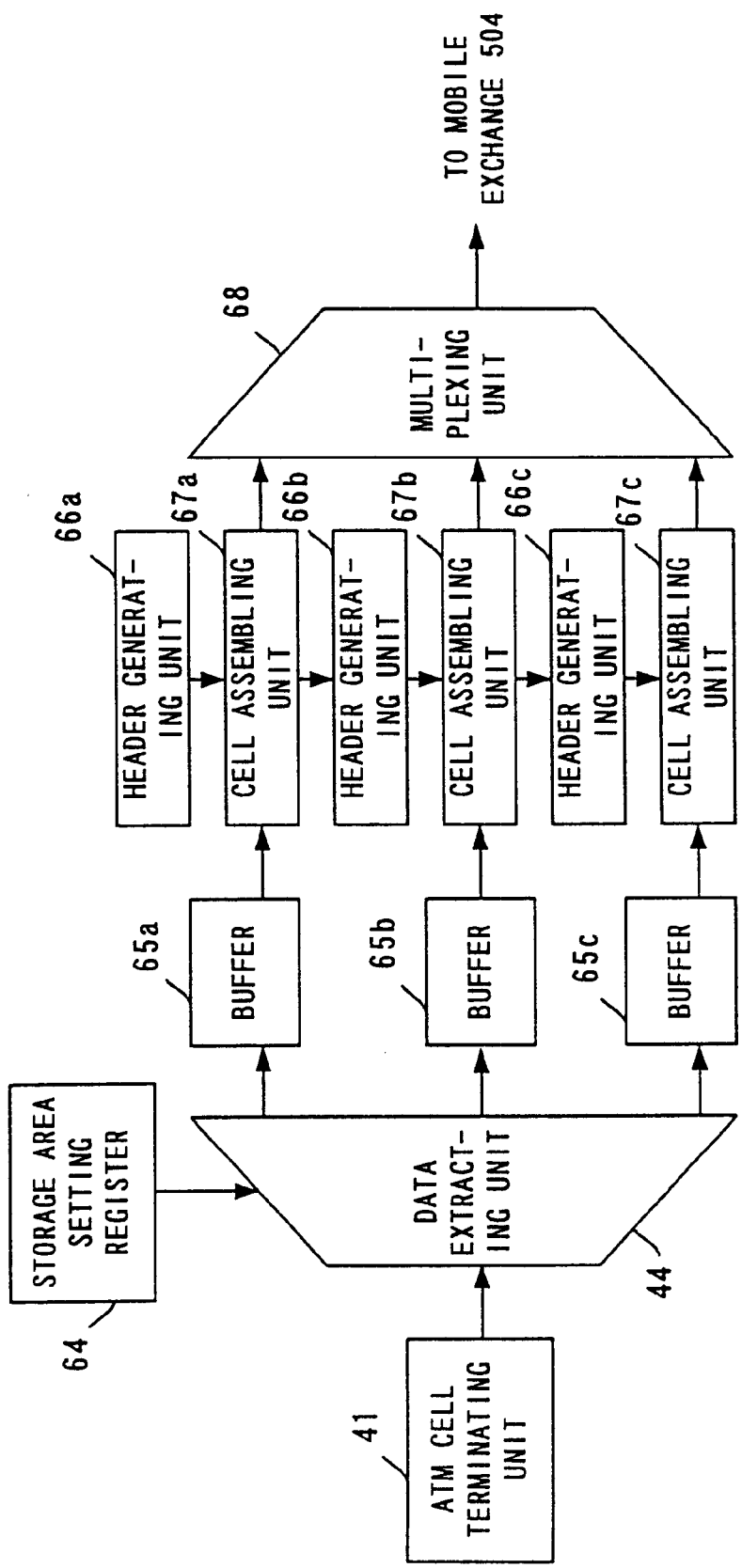
FIG. 11 shows the configuration where data are extracted from a multiplexed cell.

The data extracting unit 44 outputs the payload of the received cell provided from the ATM cell terminating unit based on the allocation pattern written to the storage area setting register 64. A specific example will be explained by referring to FIG. 11.

The data extracting unit 44 identifies the transmission source of the data stored in the first through third areas of the payload of the received cell according to the allocation pattern written to the storage area setting register 64, and writes the extracted data to the corresponding buffers 65a through 65c according to the result of the identification. For example, if the allocation pattern is (the first area, the second area, the third area)=(the base station device 2A, the base station device 2B, the base station device 2C), the data extracting unit 44 writes the data stored in the 1st to 16th bytes of the payload of the received cell to the buffer 65a, the data stored in the 17th to 32nd bytes to the buffer 65b, and the data stored in the 33rd through 48th bytes to the buffer 65c.

A header generating unit 66a generates a header including the VPI/VCI used between the mobile exchange 504 and the base station device 2A. A cell assembling unit 67a generates a cell by reading 48 bytes of the data from the buffer 65a at predetermined time intervals, and by attaching the header generated by the header generating unit 66a to the read data. The operations of header generating units 66b and 66c, and cell assembling units 67b and 67c are fundamentally the same as those of the header generating unit 66a and the cell assembling unit 67a. A multiplexing unit 68 multiplexes the cells output from the cell assembling units 67a through 67c, and transmits the multiplexed cell to the mobile exchange 504.

Figure 12:
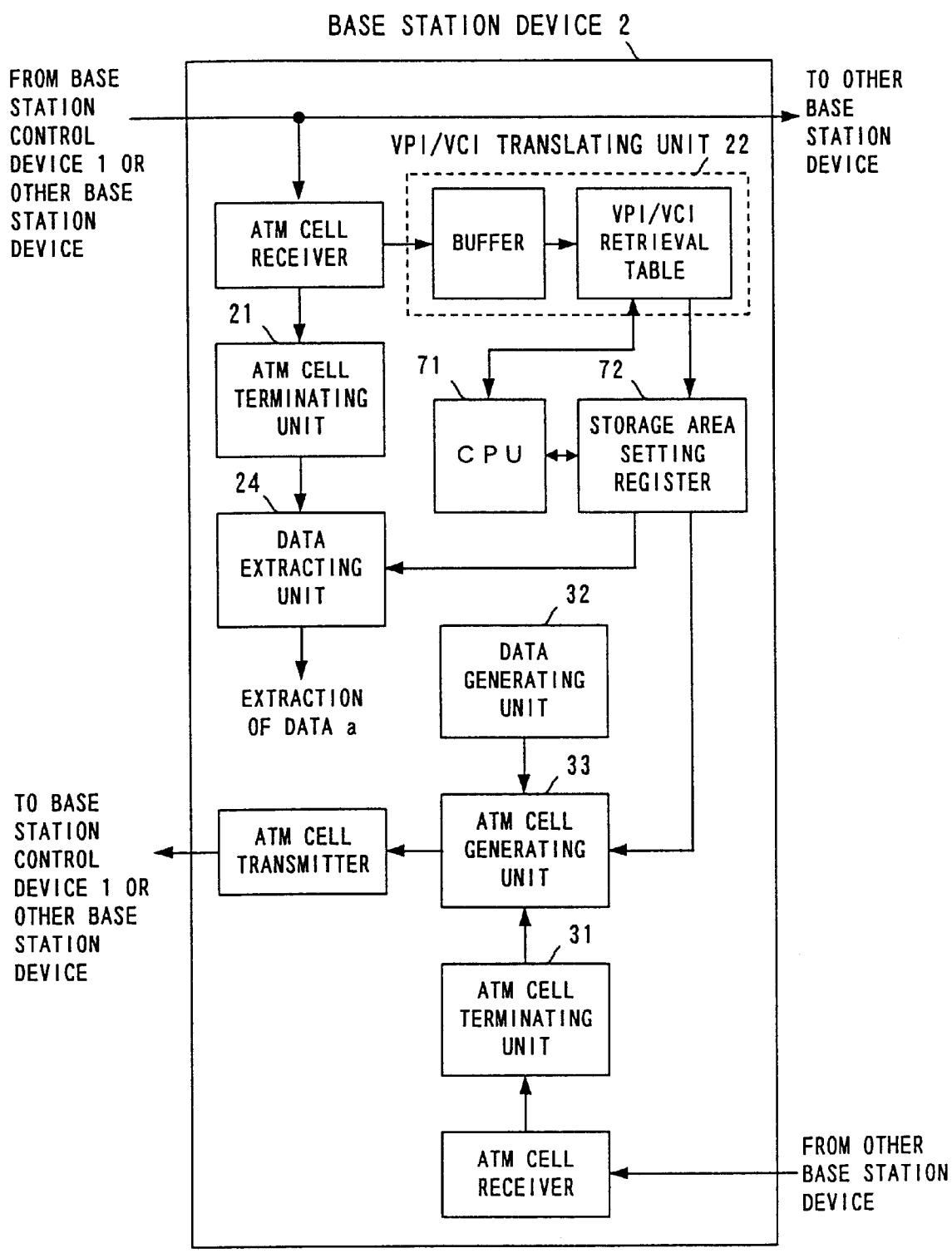
FIG. 12 is a block diagram showing the details of the base station device according to the first preferred embodiment.

FIG. 12 is a block diagram showing the details of the configuration of the base station device 2. That is, FIG. 12 illustrates the details of the base station device 2 shown in FIG. 7.

The VPI/VCI table which is shown in FIG. 9 is provided for the CPU 71, and the contents of the table are notified from the CPU 51 in the base station control device 1. The contents of the respective VPI/VCI tables provided for the CPUs of the base station control device 1 and each base station device 2 are the same as each other.

In a storage area setting register 72, information indicating the area within the payload in which the data to be extracted by a corresponding device is stored is set. For example, upon receipt of the cell in which VPI/VCI=00/0000 (hex) is set, information which indicates the first area within the payload is written to the storage area setting register 72 by referencing the VPI/VCI table, in the base station device 2A. Similarly, upon receipt of the cell in which the above described VPI/VCI is set, information which indicates the second area is written to the storage area setting register 72 in the base station device 2B, while information which indicates the third area is written to the storage area setting register 72 in the base station device 2C.

The data extracting unit 24 extracts the data from the payload of the cell stored by the ATM cell terminating unit 21 according to the setting of the storage area setting register 72. For example, if information which indicates the first area is set in the storage area setting register 72, the data extracting unit 24 extracts the data stored in the 1st to 16th bytes of the payload of the received cell, and discards the other data.

After the extracted data is once stored in a buffer, etc., it is read out at a predetermined transfer rate and is transmitted to a mobile terminal at a call destination. The process for identifying the mobile terminal to which the extracted data is to be transmitted is the process performed by a layer (AAL layer, etc.) which is higher than an ATM layer, and does not directly relate to the present invention. Therefore, its explanation is omitted here.

If the ATM cell generating unit 31 receives the cell proceeding to the base station control device 1, it writes the data generated by the data generating unit 32 to the received cell according to the setting of the storage area setting register 72. Here, the data generating unit 32 comprises the buffer for storing the data received from a mobile terminal. The ATM cell generating unit 33 reads the data from this buffer. Supposing that information which indicates the first area is set in the storage area setting register 72, the ATM cell generating unit 32 extracts 16 bytes of data from the data generating unit 32, and writes the extracted data to the 1st through 16th bytes of the payload of the cell received from the ATM terminating unit. At this time, the header is unchanged.

As described above, the method according to the first preferred embodiment provides a capability for storing data involved in a plurality of communications in the payload of a single ATM cell, and for transmitting the cell.

Second Preferred Embodiment

A method according to the second preferred embodiment is the same as that according to the first preferred embodiment in the point that data involved in a plurality of communications are stored in the payload of a single ATM cell. According to the second preferred embodiment, however, the information for designating the allocation pattern of the payload of an ATM cell is written to the area in which the VPI/VCI is set in the cell.

Figure 13:
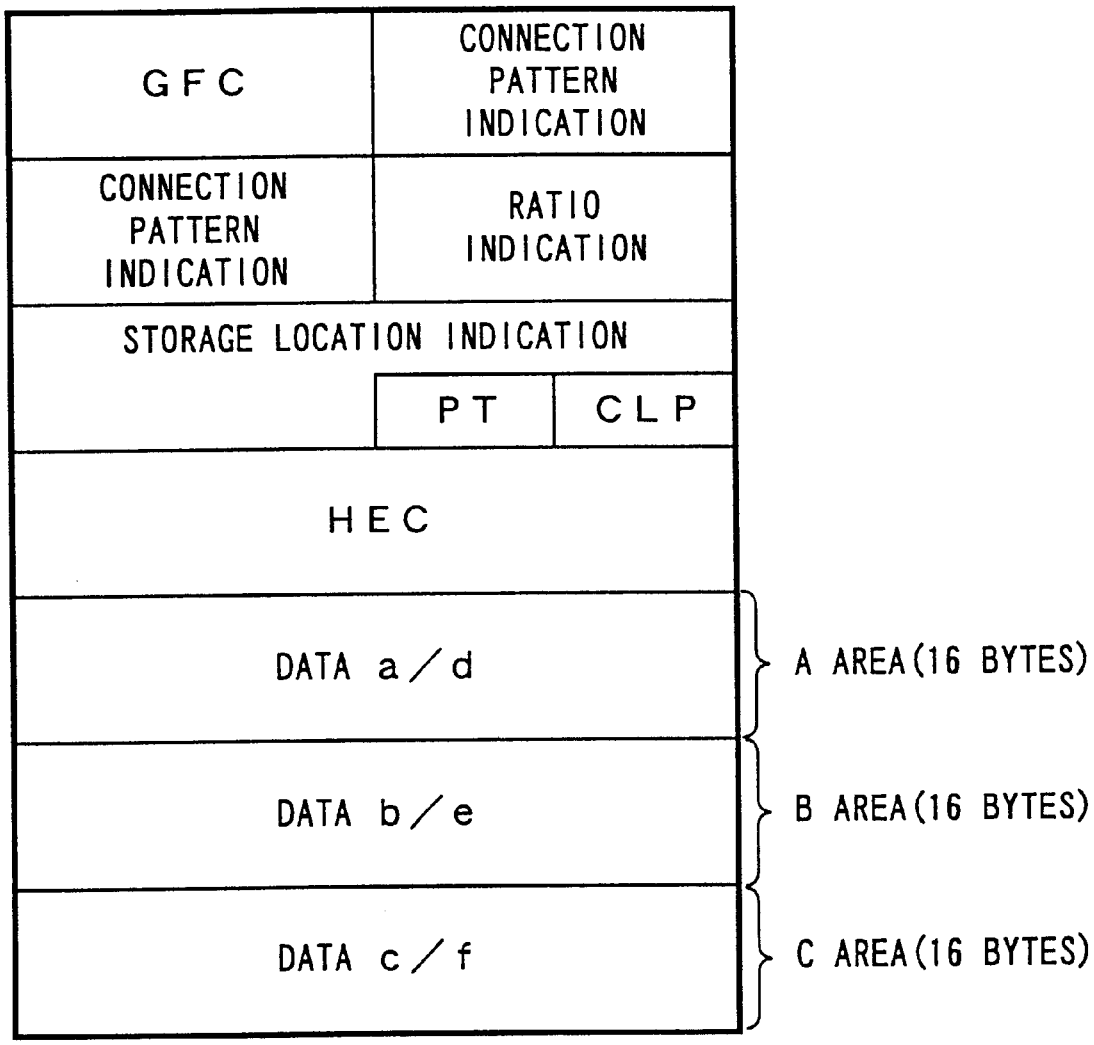
FIG. 13 shows the structure of a cell transferred between a base station control device and base station devices in a second preferred embodiment.

FIG. 13 shows the structure of the cell transferred between the base station control device 1 and the base station device 2 in the second preferred embodiment. This figure assumes that three base station devices 2A through 2C are connected to one base station control device 1 in a similar manner as in the first preferred embodiment. The header of this cell is the same as that of a normal ATM cell except for the absence of a VPI/VCI. The information for designating the allocation pattern of a payload is written to the area in which the VPI/VCI is set in the normal ATM cell. Hereinafter, this information is sometimes referred to as allocation pattern information. Although the allocation pattern information will be described in detail later, in short, it is composed of a connection pattern indication, a ratio indication, and a storage location indication. These items of information will be described later.

The payload is defined according to allocation pattern information. FIG. 13 shows the case where the three base station devices 2A through 2C are connected to the base station control device 1, and the payload is evenly allocated to the respective base station devices 2A through 2C.

Since a VPI/VCI are not assigned to the header of the cell transferred between the base station control device 1 and the base station device 2 in the second preferred embodiment, strictly speaking, this cell is not an ATM cell. However, it is referred to as a cell for the sake of convenience, here.

Figure 14:
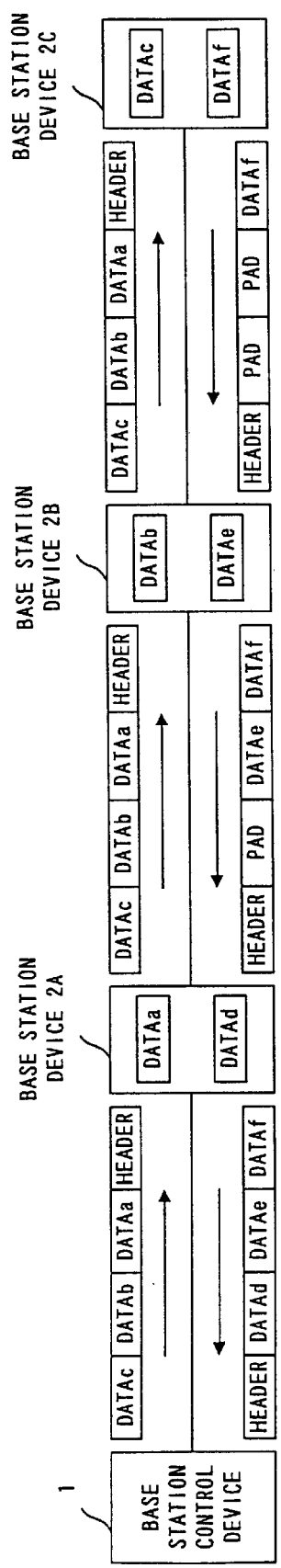
FIG. 14 explains the outline of a data transmission method according to the second preferred embodiment.

FIG. 14 explains the outline of the data transmission method according to the second preferred embodiment. In the second preferred embodiment, the base station control device 1 stores the data whose amounts are desired to be transmitted to the respective base station devices 2A through 2C in the payload of the cell to be transmitted. The cell shown in FIG. 13 is a cell used for transmitting the data whose amounts are even to the base station devices 2A through 2C. The ratio of the storage area of the payload allocated to the respective base station devices is assumed to be predetermined, for example, according to the data transfer rate of a mobile terminal accommodated by each base station device.

The base station control device 1 sets the information about the allocation of the payload of the cell to be transmitted in its header as allocation pattern information. Examples of the allocation pattern information are illustrated in FIGS. 15 and 16. A connection pattern indication designates the device at a destination to which data is to be transmitted from the base station control device 1. For example, a connection pattern indication 00000001 represents the case where data is transmitted only to the base station device 2A, and a connection pattern indication 00000111 represents the case where data are transmitted to the base station devices 2A through 2C. A ratio indication specifies the ratio of the amount or amounts of data when the data are transmitted to one or more devices designated by a connection pattern indication. For example, a ratio indication 0000 represents the case where data are evenly transmitted to designated devices. Additionally, if the ratio indication is 0001 on the condition that the connection pattern indication is 00000111, data are transmitted to the base station devices 2A through 2C in a ratio of 8:20:20, 20:8:20, or 20:20:8.

A storage location indication represents the locations within the payload, in which data to be transmitted to the respective base station devices 2A through 2C are stored. For example, if the storage location indication is 000000000000 on the condition that the connection pattern indication is 00000111 and the ratio indication is 0000, this represents that the data to be transmitted to the base station devices 2A through 2C are stored in an A, B, and C areas within the payload. If the storage location indication is 000000000001, this represents that the data to be transmitted to the base station devices 2A through 2C are respectively stored in the A, C, and B areas within the payload. The A area is an area of a predetermined number of bytes starting from the beginning of the payload, the B area is an area succeeding the A area, and the C area is an area succeeding the B area.

The table shown in FIG. 15 or 16 is arranged in the base station control device 1. It is referenced when a cell is transmitted/received to/from the base station device 2.

The cell in which the data to be transmitted to the base station device 2 is stored in the payload and the allocation pattern information is set in the header is transmitted to the base station devices 2A through 2C. The operations for transmitting the cell received by the base station device 2A to the base station device 2B, and for transmitting the cell received by the base station device 2B to the base station device 2C are the same as those explained in the first preferred embodiment.

Each base station device 2 comprises the table shown in FIG. 15 or 16. Upon receipt of a cell, each base station device 2 references the table, and extracts the data addressed to the device itself. Assume that the connection pattern indication 00000111, the ratio indication 0000, and the storage location indication 000000000000 are set as the allocation pattern information of the received cell. In this case, the base station device 2A extracts the data stored in the 1st to 16th bytes of the payload of the cell, the base station device 2B extracts the data stored in the 17th to 32nd bytes of the payload of the cell, and the base station device 2C extracts the data stored in the 33rd to 48th bytes of the payload of the cell.

When data is transmitted from the base station device 2 to the base station control device 1, the same information as that used for the allocation pattern, which is set in the cell used for transmitting data from the base station control device 1 to the base station device 2, is used as the allocation pattern information. Each base station device 2 stores the allocation pattern information set in the cell received from the base station control device 1. The base station device 2 that is farthest from the base station control device 1 (in FIG. 14, the base station device 2C) transmits the cell in which the stored allocation pattern information is set, while the other base station devices 2 respectively store the data to be transmitted to the base station control device 1 without rewriting the header of the received cell. The operation for storing a pad in an unused area within the payload, which is performed by the base station device 2C, and the operations for sequentially storing data to be transmitted, which are performed by the base station devices 2B and 2A, are the same as those explained in the first preferred embodiment.

Upon receipt of a cell from the base station device 2, the base station control device 1 identifies the transmission source of the data stored in the payload based on the allocation pattern information set in the header of the cell. The base station control device 1 then extracts the data for the respective base station devices as the transmission source.

Figure 17:
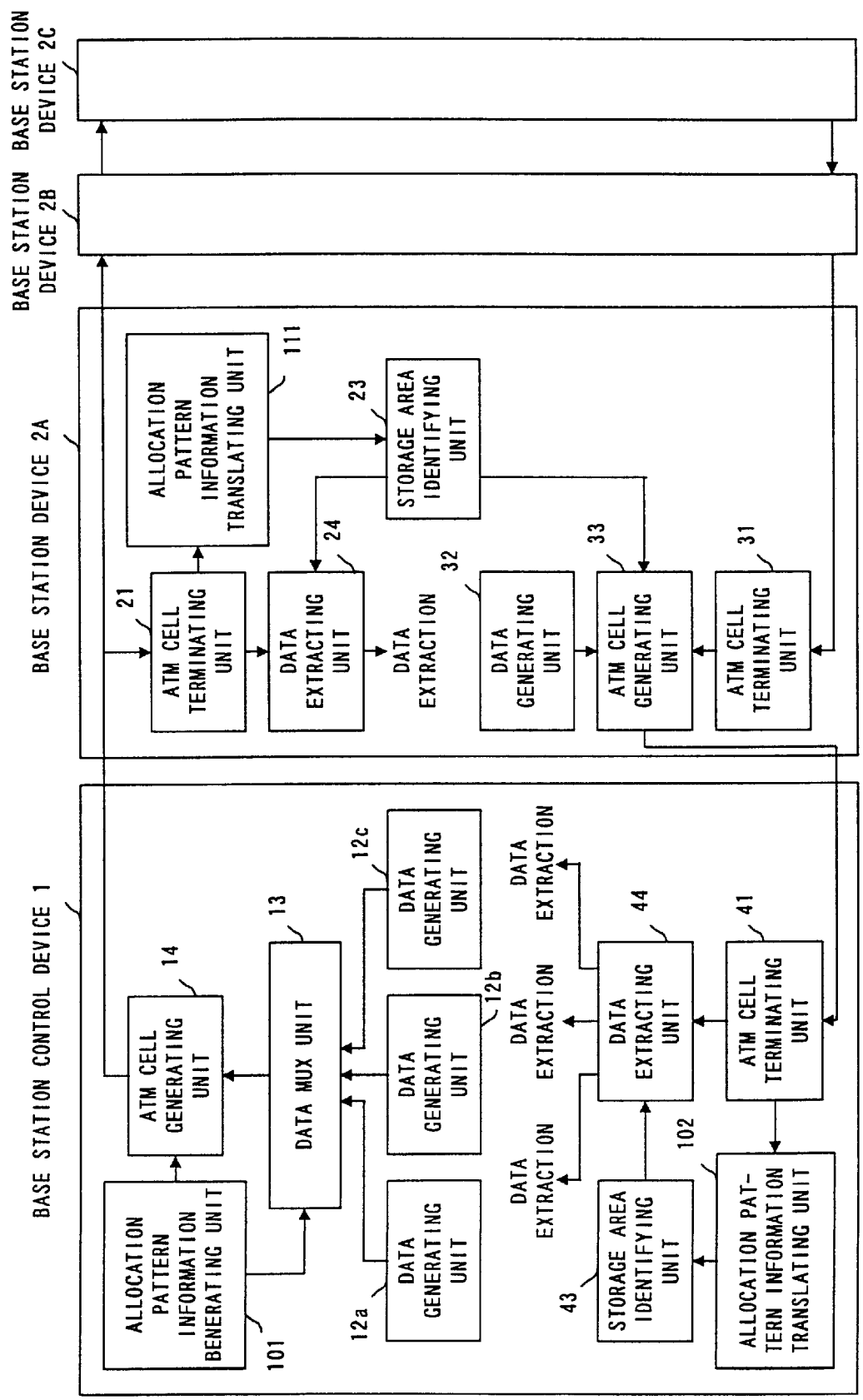
FIG. 17 is a block diagram showing the configurations of the base station control device and the base station devices according to the second preferred embodiment.

FIG. 17 is a block diagram showing the configurations of the base station control device 1 and the base station device 2 according to the second preferred embodiment. The fundamental configuration and operations of the base station control device 1 according to the second preferred embodiment are the same as those of the base station control device according to the first preferred embodiment. However, since allocation pattern information is used instead of a VPI/VCI in the second preferred embodiment, the base station control device according to the second preferred embodiment includes an allocation pattern information generating unit 101 and an allocation pattern information translating unit 102 instead of the VPI/VCI generating unit 11 and the VPI/VCI translating unit 42. The allocation pattern information generating unit 101 generates the allocation pattern information according to one or more destinations of data sets stored in the cell to be transmitted to base station devices 2, and the amount of data sets to be transmitted to each destination. The allocation pattern information translating unit 102 extracts the allocation pattern information set in the header of the cell received from the base station device 2, and analyzes the extracted information. Additionally, the base station device according to the second preferred embodiment includes an allocation pattern information translating unit 111 instead of the VPI/VCI translating unit 22. The allocation pattern information translating unit 111 extracts the allocation pattern information set in the header of the cell received from the base station control device 1 or another base station device 2, and analyzes the extracted information.

Strictly speaking, the fixed-length packet storing data to be transmitted in the second preferred embodiment is not an ATM cell as described above. However, the number of bits of the allocation pattern information and that of the VPI/VCI are the same, and hardware circuits (the ATM cell generating unit, the ATM cell terminating unit, etc.) do not make a distinction between the allocation pattern information and the VPI/VCI. Accordingly, the ATM cell generating units 14 and 33 and the ATM cell terminating units 31 and 41 according to the first preferred embodiment are the same as those according to the second preferred embodiment.

Figure 18:
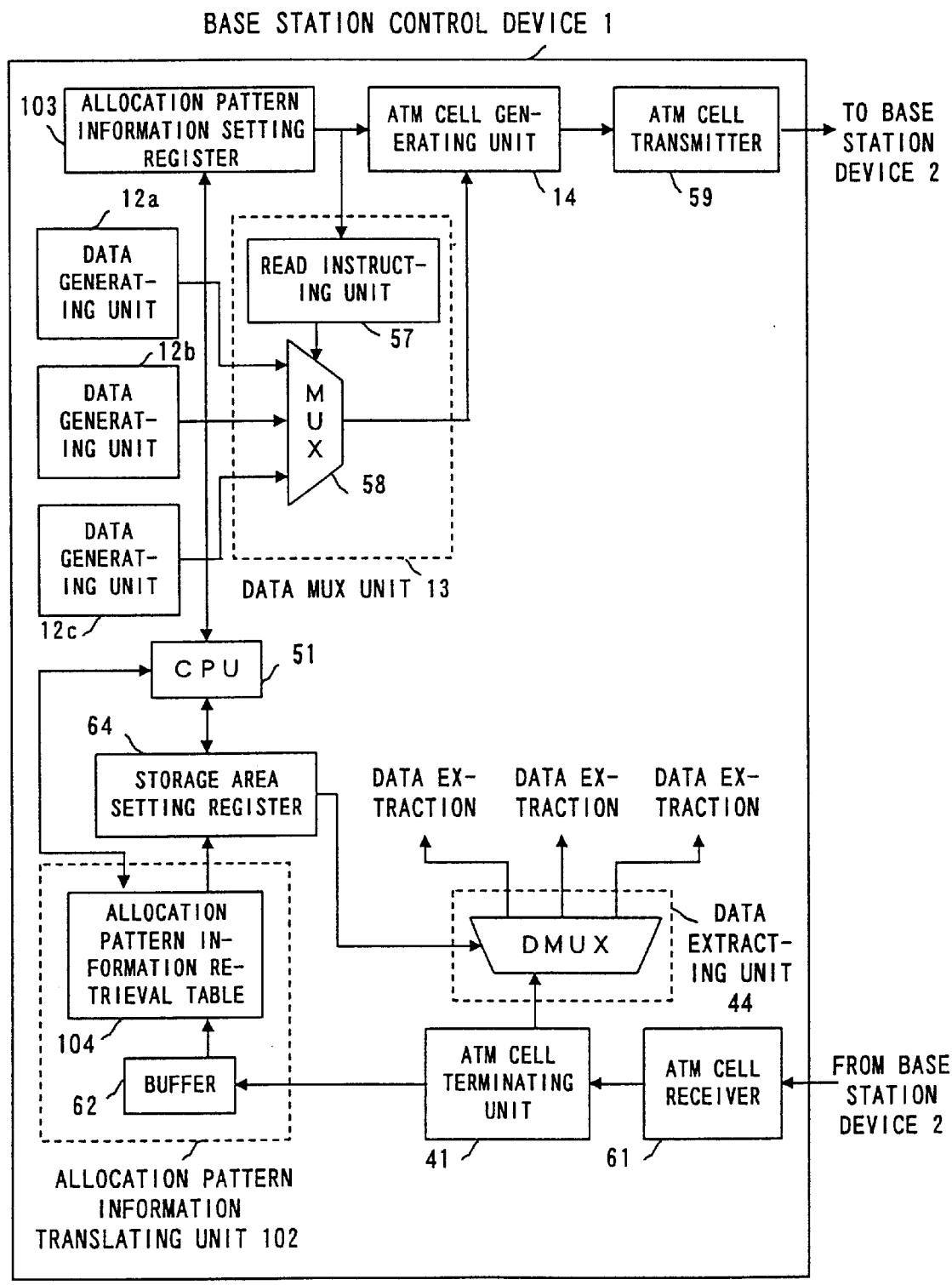
FIG. 18 is a block diagram showing the details of the base station control device according to the second preferred embodiment.

FIG. 18 is a block diagram showing the details of the configuration of the base station control device according to the second preferred embodiment. The allocation pattern information generating unit 101 shown in FIG. 17 is implemented by a CPU 51 and an allocation pattern information setting register 103. Upon determination of the allocation of the payload of the cell to be transmitted to the base station device 2, the CPU 51 references the table shown in FIG. 15 or 16, and writes the allocation pattern information corresponding to the allocation pattern to the allocation pattern information setting register 103. The operations for multiplexing data according to the setting of the allocation pattern information setting register 103, which are performed by a data MUX unit 13, and the operations for assembling a cell, which are performed by an ATM cell generating unit 14, are fundamentally the same as those in the first preferred embodiment.

An allocation pattern information retrieval table 104 is fundamentally the same as the table shown in FIG. 15 or 16. An allocation pattern information translating unit 102 identifies the transmission sources of the data stored in the payload of a received cell by retrieving the allocation pattern information retrieval table 104 with the use of the allocation pattern information set in the cell as a key, and writes information which indicates the storage area of each data to the storage area setting register 64 for each of the transmission sources. The operations for extracting the data from the received cell according to the contents of the storage are setting register 64, which are performed by the data extracting unit 44, are the same as those implemented in the first preferred embodiment.

Figure 19:
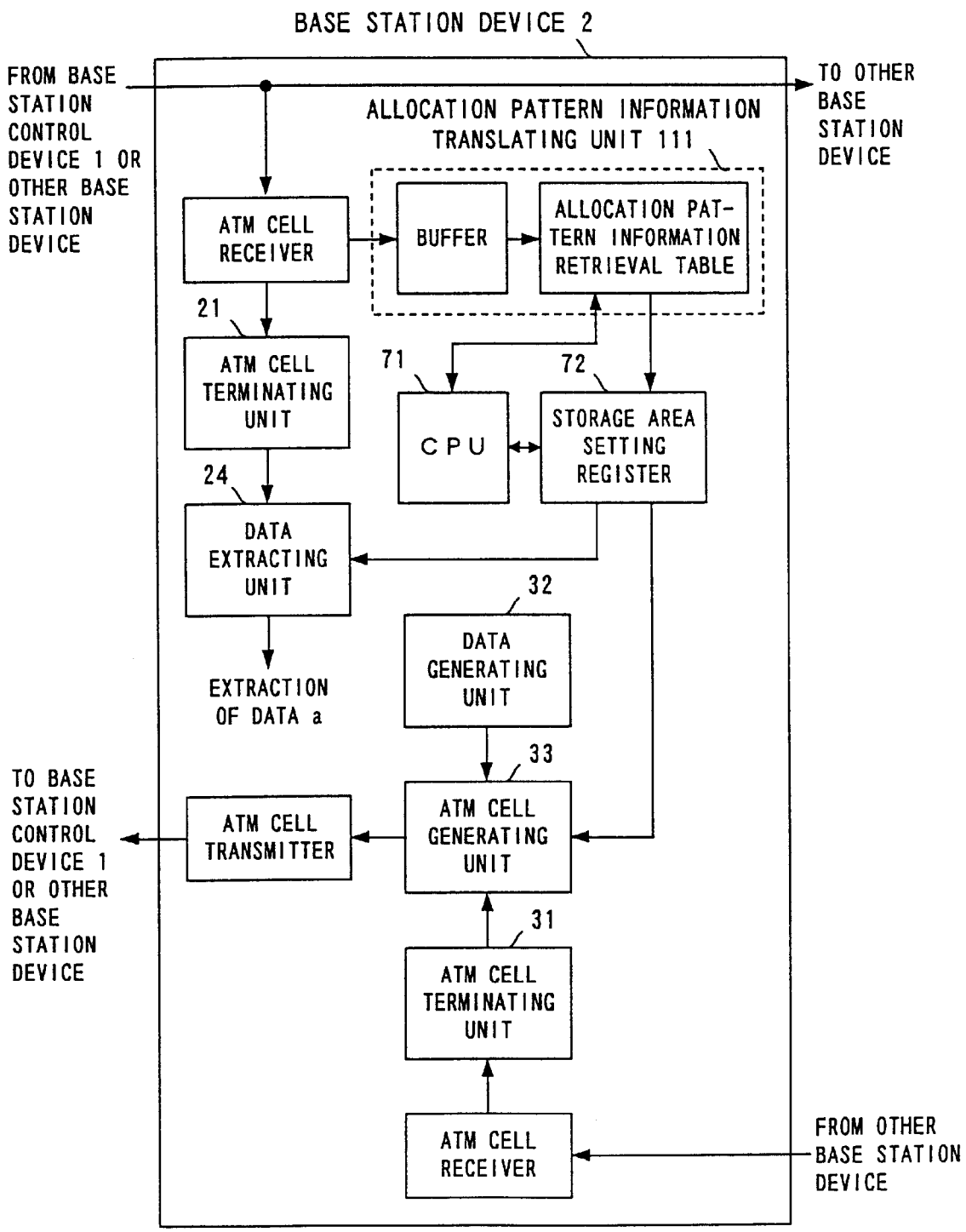
FIG. 19 is a block diagram showing the details of one of the base station devices according to the second preferred embodiment.

FIG. 19 is a block diagram showing the details of the base station device according to the second preferred embodiment. The allocation pattern information translating unit 111 comprises the table (allocation pattern information retrieval table) shown in FIG. 15 or 16. The information which is obtained from the table with the use of the allocation pattern information set in a received cell as a key is written to the storage area setting register 72. Likewise the first preferred embodiment, the data extracting unit 24 and the ATM cell generating unit 33 perform their operations according to the setting of the storage area setting register 72.

By the way, if the allocation of a payload can be dynamically changed according to the state of a base station device, data transmission efficiency can be improved in the first and second preferred embodiments. Assume that a fault occurs in the base station device 2C in the state where the payload is allocated to the three base station devices 2A through 2C in units of 16 bytes. If the 16-byte area allocated to the base station device 2C is reallocated to either of the other devices, the amount of a data transmission between the base station control device 1 and the base station device 2A or 2B increases.

Figure 20:
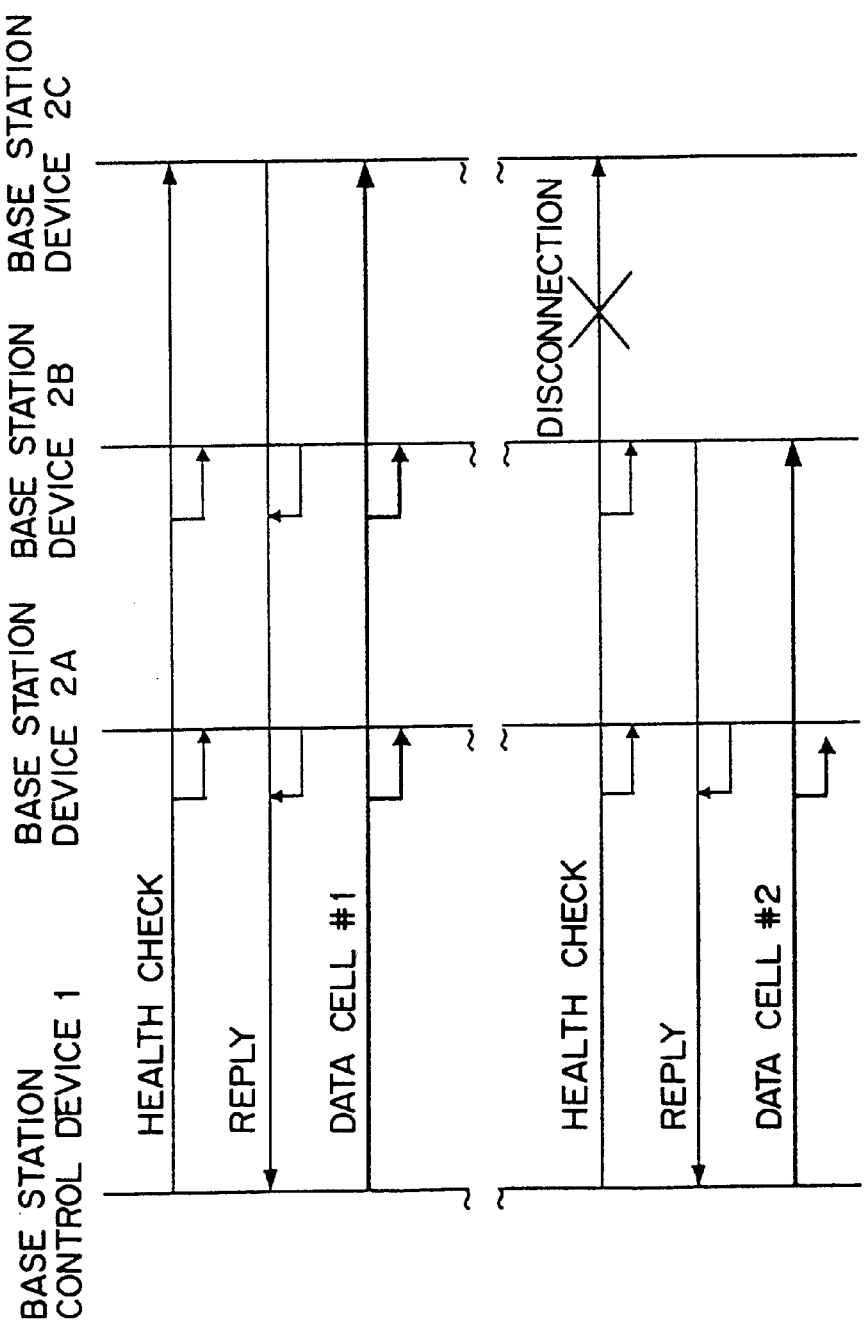
FIG. 20 explains dynamic allocation of a payload.

FIG. 20 explains the dynamic allocation of a payload. Here, the explanation will be provided by using the operations implemented with the method according to the second preferred embodiment as an example. However, also the operations implemented with the method according to the first preferred embodiment are fundamentally the same. The base station control device 1 periodically monitors the state of the base station devices 2A through 2C by transmitting a health check cell. Upon receipt of the health check cell, the base station devices 2A through 2C respectively return a reply cell to the base station control device 1. The base station control device 1 determines whether or not the respective base stations properly run by checking whether or not a reply cell can be received within a predetermined time period.

Upon receipt of reply cells from the base station devices 2A through 2C, the base station control device 1 evenly allocates a payload to the base station devices 2A through 2C, and transmits, for example, the cell in which the connection pattern indication 00000111, the ratio indication 0000, and the storage location indication 000000000000 are set as allocation pattern information. The cell in which the above described allocation pattern information are set is illustrated as a data cell #1 in FIG. 20

When a fault occurs in any of the base station devices 2A through 2C, the base station control device 1 cannot receive a reply cell from the base station device where the fault occurs, within the predetermined time period starting from when the health check cell is transmitted. In this case, the base station control device 1 automatically changes the allocation pattern of the payload. Assume that the reply cell from the base station device 2C cannot be received. Thereafter, the base station control device 1 evenly allocates the payload to the base station devices 2A nd 2B, and transmits the cell in which the connection pattern indication 00000011, the ratio indication 0000, and the storage location indication 000000000000 are set as the allocation pattern information. The cell in which these items of allocation information are set is illustrated as a data cell #2 in FIG. 20.

Figure 21:
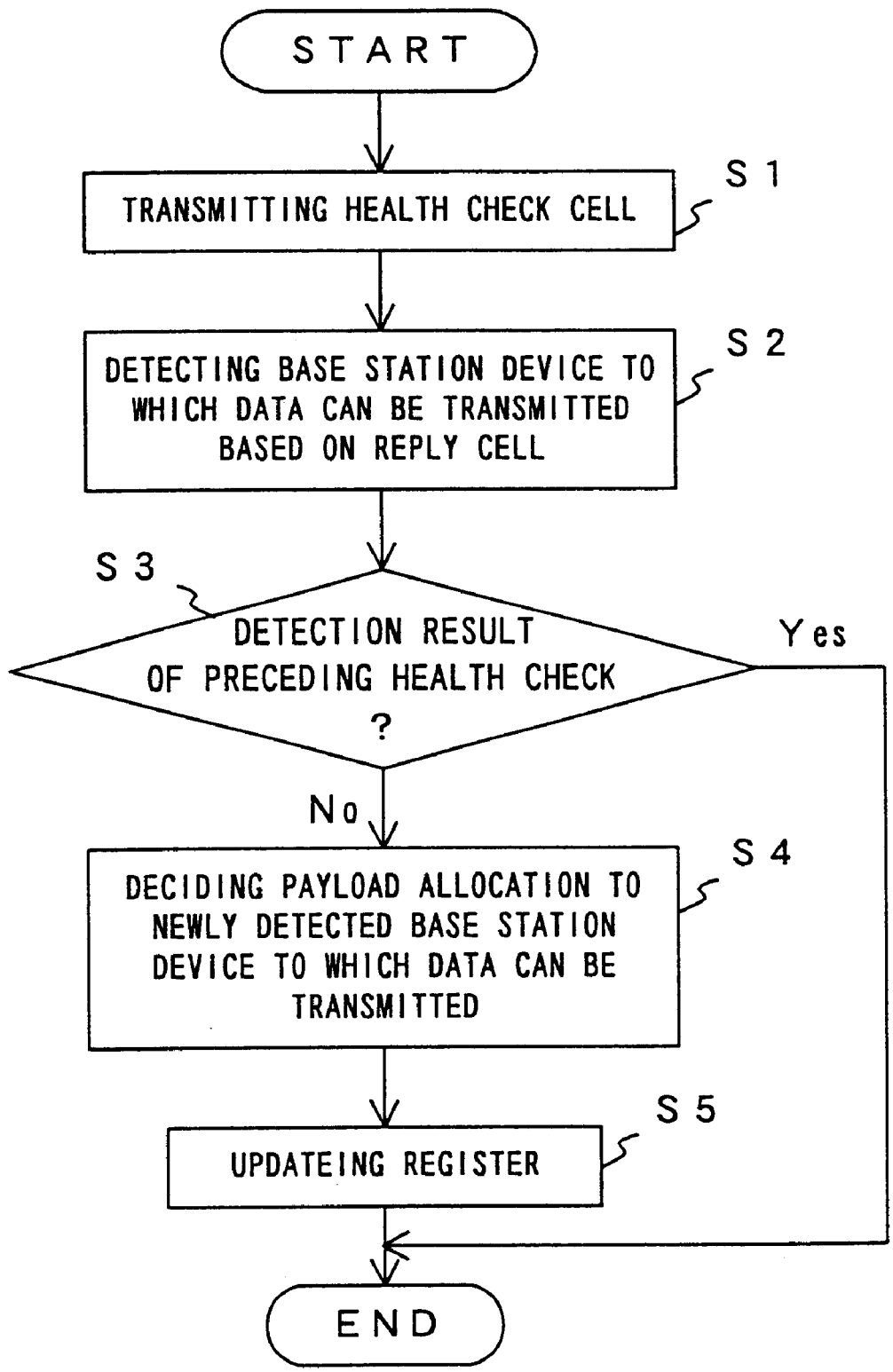
FIG. 21 is a flowchart showing the process for implementing the dynamic allocation of a payload, which is performed by the base station control device.

FIG. 21 is a flowchart showing the operations for implementing the dynamic allocation of a payload, which are performed by the base station control device. The process of this flowchart is performed at predetermined time intervals, for example, by using a timer interrupt.

In step S1, a health check cell is transmitted to the base station device 2. In step S2, a base station device to which data can be transmitted is detected based on a reply cell received within a predetermined time period. Here, the base station device at the transmission source of a reply cell is regarded as the base station device to which data can be transmitted. In step S3, the detection result of the preceding health checking in step S2, is compared with that of the present health checking in step S2. That is, whether or not the base station device to which data can be transmitted has been changed is determined.

If these detection results do not match, the combination of the base station devices to which data can be transmitted is recognized to have been changed. The process then goes to step S4, where the payload allocation to the newly detected base station devices to which data can be transmitted is decided. In step S5, the allocation pattern information setting register 103 shown in FIG. 18 is updated with reference to the table shown in FIG. 15 or 16 according to the decision made in step S4. If the detection results match, the base station devices to which data can be transmitted is recognized not to have been changed. As a result, the process skips steps S4 and S5. With the above described process, the payload allocation for storing data to be transmitted is dynamically changed according to the state of each base station device.

Note that each base station device detects the area storing the data to be extracted according to the allocation pattern information set in the cell received from the base station control device 1. Therefore, even if the above described method for dynamically allocating a payload is introduced, there is no need to add any particular capability.

The transmission methods according to the first and second preferred embodiments are characterized in that data involved in a plurality of communications are stored in a single packet (an ATM cell in the preferred embodiments), and are transmitted. However, a method for simply storing data involved in a plurality of communications in a single packet or frame and for transmitting the packet or frame is a known technique. For example, the method for storing a plurality of subframes in a single frame, and for transmitting the frame in a frame relay network is proposed (Voice over Frame Relay Implementation Agreement FRE11)

Figure 22A:
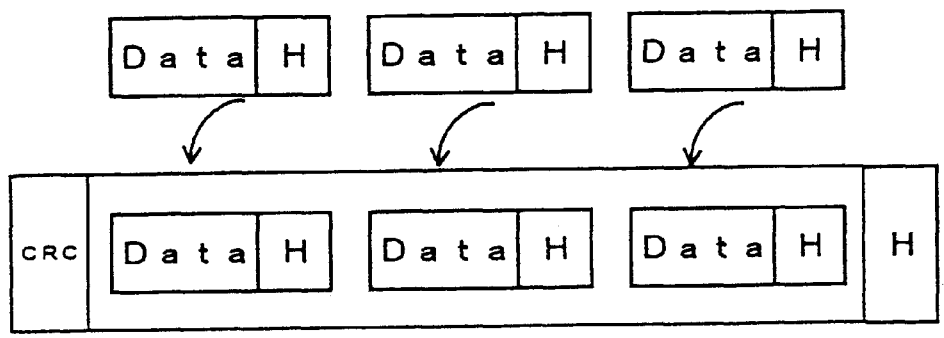
FIG. 22A explains a multiplexing method according to a conventional technique.
Figure 22B:
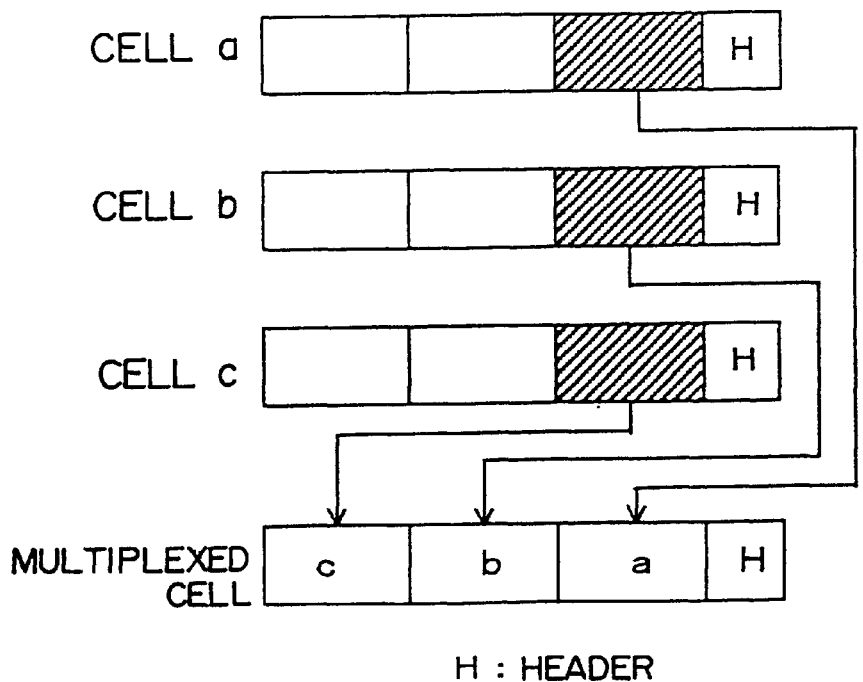
FIG. 22B explains a multiplexing method according to the present invention.

However, the following differences exist between the proposed transmission method and the transmission method according to the present invention. With the proposed method, subframes are stored in a single frame by being assigned respective headers as shown in FIG. 22A. Therefore, an overhead becomes large. In the meantime, with the transmission method according to the present invention, only data to be transmitted are stored in the payload of a cell (multiplexed cell) that stores data involved in a plurality of communications, and no header information is stored in the payload as shown in FIG. 22B. Accordingly, an overhead becomes small, so that the data transmission efficiency is high.

As described above, the data transmission methods according to the first and second preferred embodiments respectively implement different methods for identifying an allocation pattern of a payload. However, the VPI/VCI used between a base station control device 1 and one or more base station devices 2 can be arbitrarily set for a multiplexed cell, also with the method according to the first preferred embodiment. Therefore, if interpreted in a broader sense, the VPI/VCI used between the base station control device 1 and one or more base station devices 2 in the first preferred embodiment are equivalent to the allocation pattern information in the second preferred embodiment.

With the introduction of the data transmission method according to the present invention, the total cost of a transmission system can be reduced. Conventionally, a base station control device and a plurality of base station devices are respectively connected by independent transmission lines as shown in FIG. 1. According to the present invention, however, a plurality of base stations are connected in series as shown in FIG. 4, thereby reducing a transmission line cost.

Third Preferred Embodiment

The method according to the third preferred embodiment is intended to improve transmission efficiency without causing a transmission delay to occur by removing invalid data in a system for storing the invalid data (pad) in the payload of a cell depending on need and for transmitting data in order to prevent the transmission delay. To increase the efficiency, a modified cell whose length is shorter than an ATM cell is used on a predetermined transmission line or path in the third preferred embodiment.

Figure 23A:
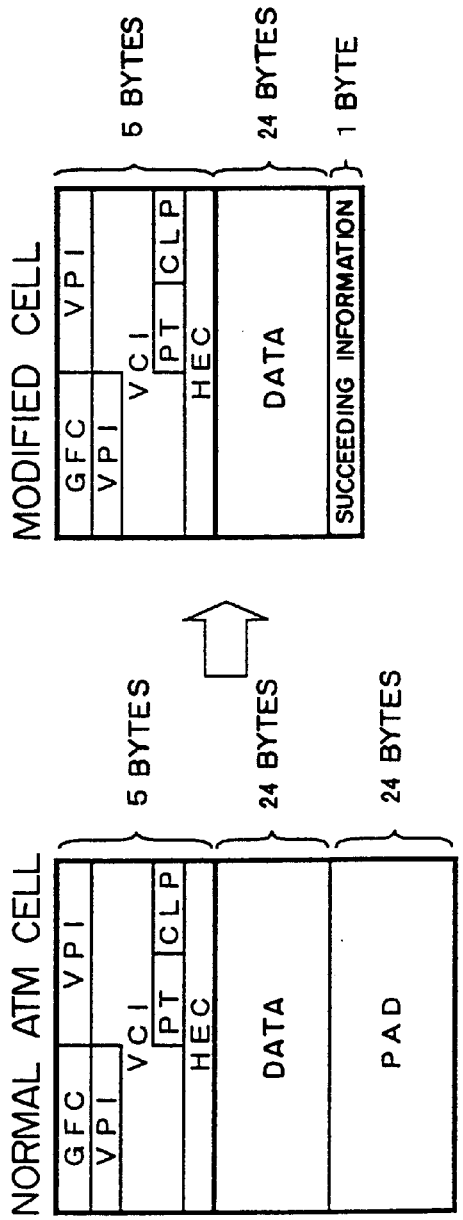
FIGS. 23A and 23B explain the cell format conversion implemented with a method according to a third preferred embodiment.
Figure 23B:
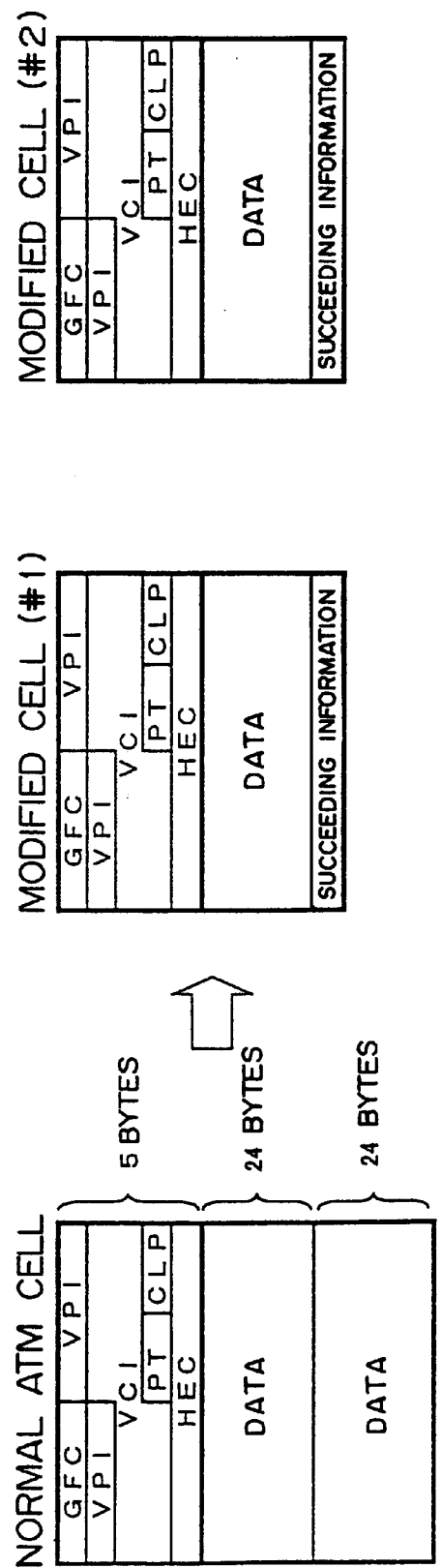

FIGS. 23A and 23B explain the cell format conversion implemented with the method according to the third preferred embodiment. The third preferred embodiment assumes a system for storing a pad in the payload of an ATM cell depending on need, and for transmitting data in order to prevent a transmission delay. Supposing that data to be stored in an ATM cell is less than 48 bytes when being transmitted, the ATM cell is transmitted by storing a pad in an unused area within its payload. Here, the data to be transmitted is assumed to be generated in units of 24 bytes for ease of explanation.

With the transmission method according to the third preferred embodiment, upon receipt of an ATM cell in which a pad is stored, a modified cell is generated by removing the pad from the cell as shown in FIG. 23A, and is transmitted. The header of the ATM cell may be used as the header of the modified cell, or may be converted into a predetermined format. Additionally, the payload of the modified cell is 24 bytes, and 1-byte succeeding information is appended to the payload. The succeeding information will be described later.

In the meantime, upon receipt of an ATM cell in which no pad is stored, that is, an ATM cell whose payload is filled with data to be transmitted, two modified cells (#1 and #2) are generated. At this time, the data stored in the fist half of the payload of the received ATM cell is stored in the payload of the modified cell #1, and while the data stored in the latter half is stored in the payload of the modified cell #2. Furthermore, in this case, the value indicating that data succeeding the data stored in the modified cell #1 exists is set in the succeeding information of the corresponding cell, while the value indicating that data succeeding the data stored in the modified cell #2 does not exist is set in the succeeding information of the corresponding cell. As described above, the succeeding information is information indicating whether or not succeeding data exists. Therefore, if a pad follows data to be transmitted within the payload of the ATM cell as shown in FIG. 23A, the value indicating that succeeding data does not exist is set as the succeeding information of the modified cell that stores the data to be transmitted.

Figure 24:
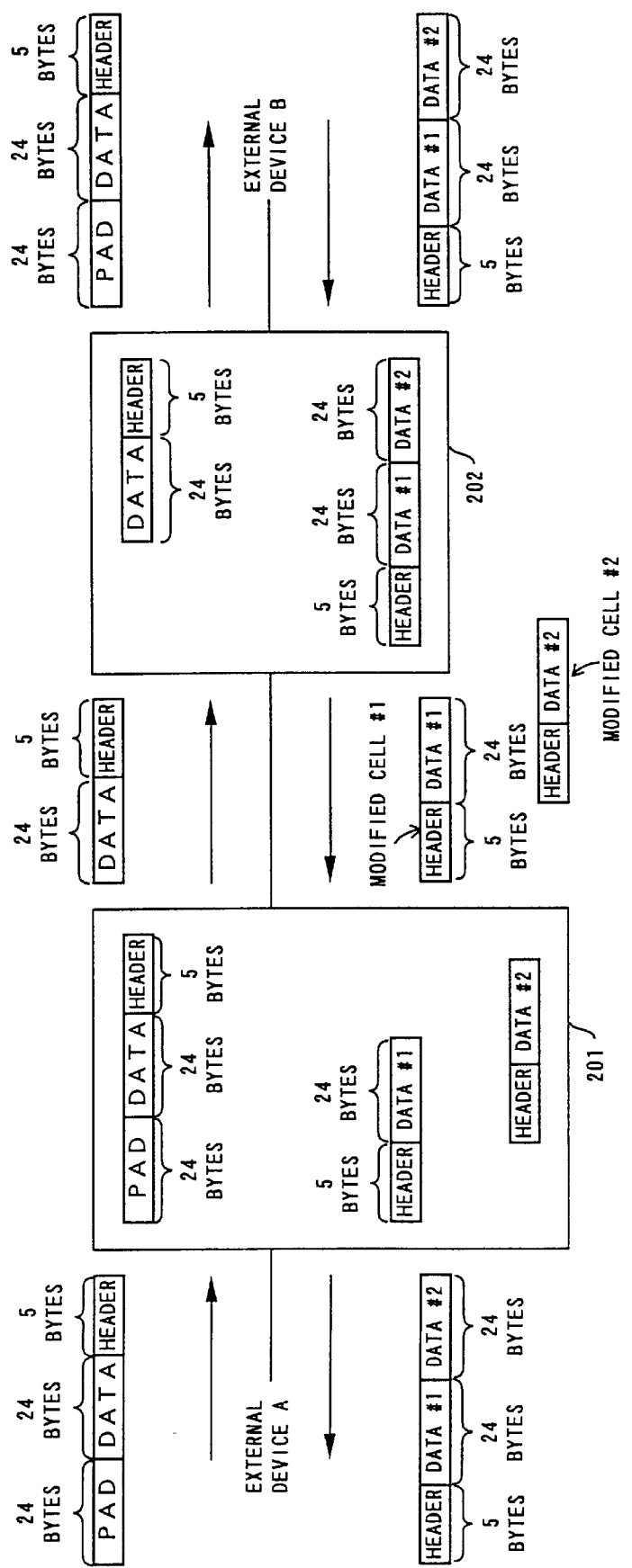
FIG. 24 explains the outline of a data transmission method according to the third preferred embodiment.

FIG. 24 explains the outline of the data transmission method according to the third preferred embodiment. In this figure, transmitting devices 201 and 202 correspond to two arbitrary devices shown in FIG. 4. For example, they correspond to the mobile exchange 504 and the base station control device 1, or the base station control device 1 and the base station device 2.

In the third preferred embodiment, data are stored in a fixed-length packet with a length different from that of an ATM cell and are transferred between the transmitting devices 201 and 202. The modified cell of 30 bytes, which is shown in FIG. 23, is a fixed-length packet transferred between the transmitting devices 201 and 202.

If the transmitting device 201 receives the ATM cell addressed to the transmitting device 202, it analyzes its payload. If data is stored in the first half of the payload of the received ATM cell and if a pad is stored in the latter half thereof, the transmitting device 201 generates a single modified cell as shown in FIG. 23A, stores the data extracted from the received ATM cell in the payload of the modified cell, and transmits the modified cell to the transmitting device 202. At this time, "No succeeding information" is set as the succeeding information.

Upon receipt of the modified cell, the transmitting device 202 analyzes the succeeding information. When the transmitting device 202 identifies the succeeding information as "No succeeding information", it generates one ATM cell. Then, the transmitting device 202 stores the data extracted from the received modified cell in the first half of the payload of the generated cell, stores a pad in the latter half of the payload, and outputs this ATM cell.

In the meantime, if the transmitting device 202 receives the ATM cell addressed to the transmitting device 201, it analyzes its payload. If data #1 is stored in the first half of the payload of the received ATM cell and if data #2 is stored in the latter half, the transmitting device 202 generates two modified cells (#1 and #2) as shown in FIG. 23B. "Succeeding information exists" and "No succeeding information" are set as the succeeding information of the modified cells #1 and #2, respectively. The transmitting device 202 then transmits these modified cells to the transmission device 201.

Upon receipt of the modified cell #1 from the transmitting device 202, the transmitting device 201 analyzes the succeeding information. If the transmitting device 201 identifies the succeeding information as "Succeeding information exists", it stores the data extracted from the received modified cell #1 without generating an ATM cell. Then, the transmitting device 201 receives the modified cell #2 from the transmitting device 202. If the transmitting device 201 identifies the succeeding information of the modified cell #2 as "No succeeding information", it generates one ATM cell, stores in the first half of the payload of the ATM cell the data which has been extracted from the modified cell #1, stores the data extracted from the modified cell #2 in the latter half of the payload, and outputs this ATM cell.

As described above, the length of a fixed-length packet (modified cell) transferred between the transmitting devices 201 and 202 is shorter than that of the fixed-length packet (ATM cell) transferred between the transmitting device 201 and an external device A or between the transmitting device 202 and an external device B. Consequently, the amount of data (the total number of bits including invalid data) to be transferred between the transmitting devices 201 and 202 can be reduced.

Assume that pads are included in the payloads of all of ATM cells and if data to be transmitted, which are stored in the payloads of the respective ATM cells, are stored in a single modified cell. In this case, introduction of the method according to the third preferred embodiment allows the total amount of data transferred between the transmitting devices 201 and 202 to be reduced significantly. By way of example, if this assumption is applied to the example shown in FIG. 23A, the total amount of data is reduced to 30/53. If the amount of data to be transmitted is decreased in this way, the bandwidth to be allocated to the corresponding communication or the transfer rate of a transmission line can be reduced.

However, ATM cells in which pads are stored and ATM cells in which no pads are stored normally coexist. It must be remembered that the above described effect cannot sometimes be obtained in this case. If the payloads of most ATM cells are filled with data to be transmitted, two modified cells are generated for the respective cells. Therefore, transmission efficiency decreases as the number of modified cells increases. Namely, the method according to the third preferred embodiment is introduced when the ratio of ATM cells whose payloads store pads is high, so that a great effect can be obtained.

Note that the length of the data storage area of a modified cell is set so as to correspond to, for example, the most frequently detected amount of valid data, which is detected by monitoring the amounts of valid data stored in the payloads of respective ATM cells. Determining the length of the data storage area of a modified cell with such a method allows data transmission efficiency to be optimized.

FIG. 25 is a block diagram showing the configurations of the transmitting devices according to the third preferred embodiment. These two opposing transmitting devices have the same configuration of at least the portion relating to the feature of this preferred embodiment.

An ATM cell receiving unit 211 receives an ATM cell of 53 bytes. A payload extracting unit 212 stores the payload of the received cell. A pad detecting unit 213 identifies the number of bytes of the data to be transmitted, which is stored in the payload, by detecting a pad included in the payload stored by the payload extracting unit 212. The pad detecting unit 213 reads the data from the payload extracting unit 212 according to the detected number of bytes of the data, and generates succeeding information. Since pad detection is a known technique, its details are not explained here. However, the detection is made, for example, in a layer higher than an ATM layer. For example, the method for detecting a pad when a predetermined number or more of consecutive "0" are detected is known.

A modified cell transmitting unit 214 generates and outputs a modified cell for storing the data read from the payload extracting unit 212. Here, if the amount of data to be transmitted, which is stored in a received ATM cell, is equal to or less than 24 bytes, one modified cell is generated. If the amount of data is more than 24 bytes, two modified cells are generated. Note that the succeeding information received from the pad detecting unit 213 is appended to each modified cell. A modified cell transmitting unit 214 transmits each modified cell.

A modified cell receiving unit 215 receives a modified cell. A succeeding information detecting unit 216 analyzes the succeeding information set at the end of a received cell that has been modified, and detects whether or not data succeeding the data stored in the received modified cell exists. A payload merging unit 217 generates a payload of 48 bytes from one or two received modified cells according to the succeeding information detected by the succeeding information detecting unit 216. If the number of bytes of the data to be stored in an ATM cell is less than 48 bytes at this time, the payload merging unit 217 adds a pad to the data so that the payload of the ATM cell to be output becomes 48 bytes. The ATM cell transmitting unit 218 then outputs the ATM cell including the payload generated by the payload merging unit 217.

FIG. 26 is a block diagram showing the details of the transmitting device according to the third preferred embodiment. The ATM cell receiving unit 211 is composed of an ATM cell receiver 221 and an ATM cell terminating unit 222. The HEC of a received ATM cell is calculated in the ATM cell terminating unit 222. The payload extracting unit 212 comprises a buffer 223 for storing the payload of a received ATM cell.

The pad detecting unit 213 comprises a buffer 224 for storing the payload of a received ATM cell and an instructing unit 225. The operations of the instructing unit 225 are explained by referring to the flowchart shown in FIG. 27.

In step S11, the number of bytes P of the pad included in the payload stored within the buffer 224 is detected. In step S12, the amount of data D of the data (valid data) to be transmitted, which is stored in the payload, is obtained by considering that the payload of the ATM cell is 48 bytes, and it is determined whether or not the amount of data D is equal to or less than 24 bytes.

If the amount of data D is equal to or less than 24 bytes, the instruction for reading the data of D bytes from the buffer 223 is issued to the payload extracting unit 212 in step S13. Then, in step S14, 0 is provided as the succeeding information to the modified cell transmitting unit 214. Here, the succeeding information 0 means that no succeeding data exists.

If the amount of data D is more than 24 bytes, the instruction for reading the data of 24 bytes from the buffer 223 is issued to the payload extracting unit 212 in step S15. Then, in step S16, 1 is provided to the modified cell transmitting unit 214 as the succeeding information. The succeeding information 1 means that succeeding information exists. In step S17, the instruction for reading the data of D-24 bytes from the buffer 223 is issued to the payload extracting unit 212. Then, in step S18, 0 is provided to the modified cell transmitting unit 214 as the succeeding information.

With the above described process, one data set and the corresponding succeeding information are output if data stored in a received ATM cell is equal to or less than 24 bytes, or two data sets and the respectively corresponding succeeding information are output if the data is more than 24 bytes. This process may be implemented by either software or hardware.

The modified cell transmitting unit 214 comprises an MUX unit 226 and a modified cell transmitter 227. The MUX unit 226 generates a modified cell by attaching a header and succeeding information to the data set output from the payload extracting unit 212. If the data set output from the payload extracting unit 212 is less than 24 bytes at this time, a pad is added so that the amount of data totals 24 bytes. The modified cell transmitter 227 transmits the generated modified cell.

The modified cell receiving unit 215 is composed of a modified cell receiver 231 and an ATM cell terminating unit 232. The HEC of a received modified cell is calculated in the modified cell terminating unit 232. The succeeding information detecting unit 216 comprises a buffer 233 for storing the payload of a received cell and an instruction information setting register 234. Succeeding information stored in the received modified cell is written to the instruction information setting register 234. The payload merging unit 217 generates an ATM cell based on the succeeding information stored in the instruction information setting register 234. The ATM cell transmitting unit 218, which includes an ATM cell transmitter 235, outputs the ATM cell generated by the payload merging unit 217.

Figure 28:
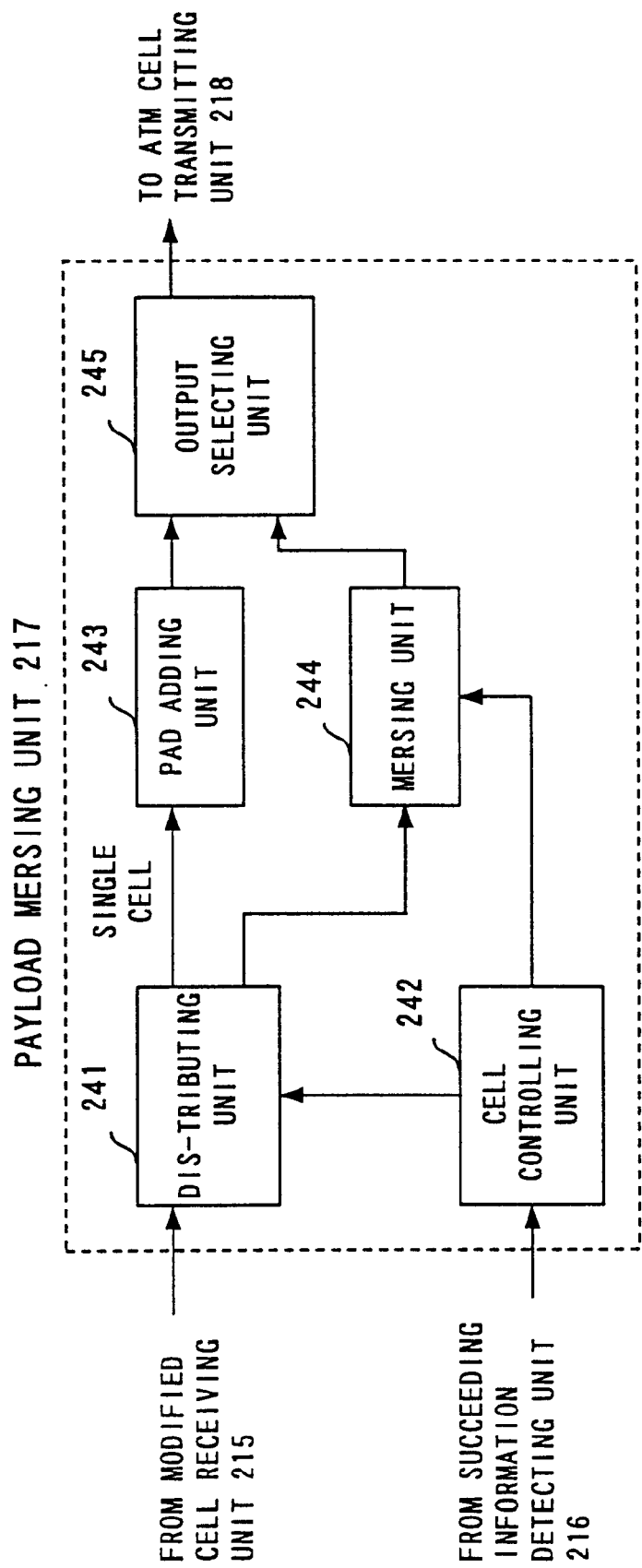
FIG. 28 is a block diagram showing the details of a payload merging unit.

FIG. 28 is a block diagram showing the details of the payload merging unit 217 shown in FIG. 26. A distributing unit 24 stores the data set received from the modified cell receiving unit 215, and outputs the data set to a pad adding unit 243 or a merging unit 244 according to the instruction issued from a cell controlling unit 242.

The cell controlling unit 242 includes a succeeding information flag. The succeeding information flag is set if the succeeding information received from the succeeding information detecting unit 216 is 1, or it is reset if the succeeding information is 0. The cell controlling unit 242 issues an output instruction to the distributing unit 241 according to the succeeding information flag, and issues a generation instruction to the merging unit 244. Specifically, the cell controlling unit 242 issues to the distributing unit 241 the instruction for outputting a data set to the merging unit 244, if it receives 1 (=Succeeding information exists) as the succeeding information when the data set is stored in the distributing unit 241. Then, the cell controlling unit 242 issues an instruction for holding the data set to the merging unit 244. Furthermore, the cell controlling unit 242 sets the succeeding information flag.

If the cell controlling unit 242 receives 0 (=No succeeding information) as the succeeding information corresponding to a data set when the data set is stored in the distributing unit 241, it firstly references the succeeding information flag. If the succeeding information flag is set, the cell controlling unit 242 issues to the distributing unit 241 the instruction for outputting the data set to the merging unit 244. Additionally, the cell controlling unit 242 issues to the merging unit 244 the instruction for merging the data set output from the distributing unit 241 and the previously stored data set. Then, the cell controlling unit 242 resets the succeeding information flag.

If the succeeding information flag is reset upon receipt of 0 (=No succeeding information) as the succeeding information, the cell controlling unit 242 issues to the distributing unit 241 the instruction for outputting the data set to the pad adding unit 243.

Upon receipt of the data set from the distributing unit 241, the pad adding unit 243 generates a payload of 48 bytes by adding a pad. The merging unit 244 generates a payload of 48 bytes by merging two successive data sets received from the distributing unit 241. If the data set obtained by merging the two data sets is less than 48 bytes, a pad is added. An output selecting unit 245 attaches an ATM header to the payload of 48 bytes output from the pad adding unit 243 or the merging unit 244, and outputs the payload with the ATM header attached.

With the above described method according to the third preferred embodiment, a modified cell is used only on a particular transmission line in an ATM network, and the conversion between an ATM cell and a modified cell can be easily performed. Accordingly, the method according to the third preferred embodiment can be easily introduced into an existing ATM device, namely, this method is superior in system expandability.

According to the present invention, data involved in a plurality of communications are stored in a single fixed-length packet and are transmitted, whereby the time intervals at which the data involved in the respective communications are transmitted can be continuously shortened. As a result, data transmission efficiency can be improved while preventing a transmission delay from occurring.

Additionally, according to the present invention, invalid data are removed as much as possible by using a packet whose length is shorter than a standard cell in a system for storing invalid data in the payload of a cell depending on need in order to prevent a transmission delay and for transmitting data, thereby improving the data transmission efficiency.

What is claimed is:

1. A data transmission method for transmitting data by using a fixed-length packet from a transmitting device to a plurality of receiving devices, comprising the steps of:

allocating a data storage area of a fixed-length packet to one or more of the plurality of receiving devices;

storing only data to be transmitted to the receiving device or devices to which the data storage area of the fixed-length packet is allocated in a corresponding area within the fixed-length packet;

storing allocation information indicating an allocation pattern of the data storage area of the fixed-length packet in a header of the fixed-length packet, said allocation information comprising a connection pattern indication, a ratio indication and a storage location indication;

transmitting the fixed-length packet from the transmitting device to the plurality of receiving devices; and extracting data from the data storage area of the fixed-length packet based on the allocation information stored in the header of the fixed-length packet, within the plurality of receiving devices.

2. The data transmission method according to claim 1, wherein:

the plurality of receiving devices are connected in series;

the transmitting device transmits the fixed-length packet to one of the plurality of receiving devices; and the plurality of receiving devices sequentially transfers the fixed-length packet.

3. The data transmission method according to claim 1, wherein:

the fixed-length packet is an ATM cell; and a virtual path identifier/virtual channel identifier are used as the allocation information.

4. The data transmission method according to claim 1, wherein the allocation pattern of the data storage area of the fixed-length packet is changed based on respective communication states of the plurality of receiving devices.

5. A data transmission method for transmitting data by using a fixed-length packet from a transmitting device to a plurality of receiving devices, which are connected in series, comprising the steps of:

allocating a data storage area of a fixed-length packet to one or more of the plurality of receiving devices;

storing data to be transmitted to the receiving device or devices to which the data storage area of the fixed-length packet is allocated in a corresponding area within the fixed-length packet;

storing allocation information indicating an allocation pattern of the data storage area of the fixed-length packet in a header of the fixed-length packet, said allocation information comprising a connection pattern indication, a ratio indication and a storage location indication;

transmitting the fixed-length packet from the transmitting device to the plurality of receiving devices; and extracting data from the data storage area of the fixed-length packet based on the allocation information stored in the header of the fixed-length packet, within the plurality of receiving devices.

6. A data transmission system for transmitting data by using a fixed-length packet from a transmitting device to a plurality of receiving devices, wherein:

the transmitting device comprises:

data storing means for allocating a data storage area of a fixed-length packet to one or more of the plurality of receiving devices, and for storing only data to be transmitted to the receiving device or devices to which the data storage area of the fixed-length packet is allocated in a corresponding area within the fixed-length packet;

allocation information storing means for storing allocation information indicating an allocation pattern of the data storage area of the fixed-length packet in a header of the fixed-length packet, said allocation information comprising a connection pattern indication, a ratio indication and a storage location indication; and transmitting means for transmitting the fixed-length packet to the plurality of receiving devices; and each of the plurality of receiving devices comprises:

extracting means for extracting corresponding data from the data storage area of the fixed-length packet based on the allocation information stored in the header of the fixed-length packet.

7. A data transmission system for transmitting data by using a fixed-length packet to a plurality of receiving devices, comprising:

data storing means for allocating a data storage area of a fixed-length packet to one or more of the plurality of receiving devices, and for storing only data to be transmitted to the receiving device or devices to which the data storage area of the fixed-length packet is allocated in a corresponding area within the fixed-length packet;

allocation information storing means for storing allocation information indicating an allocation pattern of the data storage area of the fixed-length packet in a header of the fixed-length packet, said allocation information comprising a connection pattern indication, a ratio indication and a storage location indication; and transmitting means for transmitting the fixed-length packet to the plurality of receiving devices, which respectively extract corresponding data from the data storage area of the fixed-length packet based on the allocation information stored in the header of the fixed-length packet when the plurality of receiving devices respectively receive the fixed-length packet.

8. A data receiving device, which is an arbitrary one of a plurality of receiving devices receiving data transmitted by using a fixed-length packet from a transmitting device, comprising:

receiving means for receiving a fixed-length packet from the transmitting device, wherein the transmitting device allocates a data storage area of the fixed-length packet to one or more of a plurality of receiving devices, stores only data to be transmitted to the receiving device or devices to which the data storage area of the fixed-length packet is allocated in a corresponding area within the fixed-length packet, and stores allocation information indicating an allocation pattern of the data storage area of the fixed-length packet in a header of the fixed-length packet, said allocation information comprising a connection pattern indication, a ratio indication and a storage location indication; and extracting means for extracting corresponding data from the data storage area of the fixed-length packet based on the allocation information stored in the header of the fixed-length packet.

9. A data transmission method for transmitting data by using a fixed-length packet form a plurality of transmitting devices, which are connected in series, to a receiving device, comprising the steps of:

allocating a data storage area of a fixed-length packet to one or more of the plurality of transmitting devices;

storing allocation information indicating a pattern for allocating the data storage area to the plurality of transmitting devices in a header of the fixed-length packet, said allocation information comprising a connection pattern indication, a ratio indication and a storage location indication;

respectively storing data to be transmitted to the receiving device in the data storage area of the fixed-length packet according to the allocation information stored in the header of the fixed-length packet within each of the plurality of transmitting devices, when transmitting fixed-length packet to the receiving device sequentially via the plurality of transmitting devices; and extracting data for each of the plurality of transmitting devices from the data storage area of the fixed-length packet based on the allocation information stored in the header of the fixed-length packet, within the receiving device.

10. The data transmission method according to claim 9, wherein:

the fixed-length packet is an ATM cell; and a virtual path identifier/virtual channel identifier are used as the allocation information.

11. The data transmission method according to claim 9, wherein the allocation pattern of the data storage area of the fixed-length packet is changed based on respective communication states of the plurality of transmitting devices.

12. A data transmission system for transmitting data by using a fixed-length packet from a plurality of transmitting devices, which are connected in series, to a receiving device, wherein:

an arbitrary one of the plurality of transmitting devices comprises:

means for storing allocation information indicating an allocation pattern used when a data storage area of a fixed-length packet is allocated to one or more of the plurality of transmitting devices, in a header of the fixed-length packet, said allocation information comprising a connection pattern indication, a ratio indication and a storage location indication;

each of the plurality of transmitting devices comprises:

means for storing data to be transmitted to the receiving device based on the allocation information stored in a header of the fixed-length packet, when transmitting the fixed-length packet to the receiving device sequentially via the plurality of transmitting devices; and the receiving device comprises:

means for extracting data for each of the plurality of transmitting devices from the data storage area of the fixed-length packet based on the allocation information stored in the header of the fixed-length packet.

13. A data transmission method for transmitting data from a first device to a second device, which are arranged in a network for transferring a first fixed-length packet, comprising the steps of:

extracting, within the first device, valid data stored in a data storage area of the first fixed-length packet upon receipt of the first fixed-length packet to be transmitted to the second device;

storing the extracted valid data in a data storage area of the second fixed-length packet which is shorter than the first fixed-length packet; and transmitting the second fixed-length packet to the second device;

wherein when the valid data stored in the first fixed-length packet is partitioned into a plurality of data sets and is stored in a plurality of second fixed-length packets, succeeding information indicating that succeeding data exists is added to a second fixed-length packet storing a data set which does not include the end of the valid data, while succeeding information indicating that no succeeding data exists is added to a second fixed-length packet storing a data set which includes the end of the valid data.

14. The data transmission method according to claim 13, wherein the second device extracts the valid data stored in the second fixed-length packet, stores the extracted valid data in the data storage area of the first fixed-length packet, and outputs the first fixed-length packet to the network.

15. The data transmission method according to claim 13, wherein the first transmitting device extracts the valid data by removing a pad stored in the data storage area of the first fixed-length packet.

16. The data transmission method according to claim 13, wherein the second device generates a first fixed-length packet based on the succeeding information added to the second fixed-length packet.

17. A data transmission system for transferring data between a first transmitting device and a second transmitting device, which are arranged in a network for transferring a first fixed-length packet, wherein the first transmitting device comprises:

extracting means for extracting valid data stored in a data storage area of a first fixed-length packet upon receipt of the first fixed-length packet to be transmitted to the second transmitting device;

storing means for storing the valid data extracted by said extracting means in a data storage area of a second fixed-length packet which is shorter than the first fixed-length packet; and transmitting means for transmitting the second fixed-length packet to the second transmitting device;

wherein when the valid data stored in the first fixed-length packet is partitioned into a plurality of data sets and is stored in a plurality of second fixed-length packets, succeeding information indicating that succeeding data exists is added to a second fixed-length packet storing a data set which does not include the end of the valid data, while succeeding information indicating that no succeeding data exists is added to a second fixed-length packet storing a data set which includes the end of the valid data.

18. A data transmission device as a first transmitting device in a system where data are transmitted between the first transmitting device and a second transmitting device, which are arranged in a network for transferring a first fixed-length packet, comprising:

extracting means for extracting valid data stored in a data storage area of the first fixed-length packet upon receipt of the first fixed-length packet to be transmitted to the second transmitting device;

storing means for storing the valid data extracted by said extracting means in a data storage area of the second fixed-length packet which is shorter than the first fixed-length packet; and transmitting means for transmitting the second fixed-length packet to the second transmitting device;

wherein when the valid data stored in the first fixed-length packet is partitioned into a plurality of data sets and is stored in a plurality of second fixed-length packets, succeeding information indicating that succeeding data exists is added to a second fixed-length packet storing a data set which does not include the end of the valid data, while succeeding information indicating that no succeeding data exists is added to a second fixed-length packet storing a data set which includes the end of the valid data.

* * * * *